United States Patent
Ling et al.

(10) Patent No.: US 12,395,941 B2
(45) Date of Patent: Aug. 19, 2025

(54) METHOD AND APPARATUS FOR POWER CONTROL OF CONFIGURED GRANT PUSCH REPETITION

(71) Applicant: Lenovo (Beijing) Ltd., Beijing (CN)

(72) Inventors: Wei Ling, Changping (CN); Chenxi Zhu, Haidian District (CN); Bingchao Liu, Changping District (CN); Yi Zhang, Chao Yang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 241 days.

(21) Appl. No.: 17/999,587

(22) PCT Filed: May 22, 2020

(86) PCT No.: PCT/CN2020/091798
§ 371 (c)(1),
(2) Date: Nov. 22, 2022

(87) PCT Pub. No.: WO2021/232405
PCT Pub. Date: Nov. 25, 2021

(65) Prior Publication Data
US 2023/0309022 A1    Sep. 28, 2023

(51) Int. Cl.
*H04W 52/14* (2009.01)
*H04B 7/0456* (2017.01)
(Continued)

(52) U.S. Cl.
CPC ........ *H04W 52/146* (2013.01); *H04B 7/0456* (2013.01); *H04W 52/08* (2013.01); *H04W 52/242* (2013.01)

(58) Field of Classification Search
CPC . H04W 52/146; H04W 52/08; H04W 52/242; H04W 52/10; H04W 52/38;
(Continued)

(56) References Cited

U.S. PATENT DOCUMENTS

| 9,148,818 B2 * | 9/2015 | Yue ........................ H04L 5/0051 |
| 2016/0087709 A1 * | 3/2016 | Horiuchi ............... H04L 1/0001 |
| | | 375/260 |

(Continued)

FOREIGN PATENT DOCUMENTS

| CN | 102378341 A | 3/2012 |
| CN | 10724754 A | 9/2017 |

(Continued)

OTHER PUBLICATIONS 20937129.3, "Extended European Search Report", European Application No. 20937129.3, Jan. 30, 2024, 16 pages.

(Continued)

*Primary Examiner* — Dominic E Rego
(74) *Attorney, Agent, or Firm* — FIG. 1 Patents

(57) ABSTRACT

Embodiments of the present disclosure are directed to a method and apparatus for power control of configured grant PUSCH repetition. A method according to an embodiment of the present application may include: receiving a configuration including a mapping transmitting a configuration for a configured grant pattern and a plurality of pathloss reference RS Ids for a configured PUSCH transmission which is configured to be grant physical uplink shared channel (PUSCH) transmission, which transmitted in a plurality of time intervals repeatedly is configured to be transmitted in a plurality of time intervals repeatedly by higher layer signaling; determining a power of each PUSCH repetition of the configured grant PUSCH transmission based on the configuration; and transmitting the configured grant PUSCH transmission in the plurality of time intervals repeatedly based on the de-ermined power of each PUSCH repetition of the PUSCH transmission and the mapping pattern.

20 Claims, 8 Drawing Sheets

(51) Int. Cl.
*H04W 52/08* (2009.01)
*H04W 52/24* (2009.01)

(58) Field of Classification Search
CPC ....... H04B 7/0456; H04B 7/0617; H04L 1/08; H04L 1/1861; H04L 5/0044; H04L 5/0051; H04L 5/0094
See application file for complete search history.

(56) References Cited

U.S. PATENT DOCUMENTS

| | | | |
|---|---|---|---|
| 2016/0315683 A1* | 10/2016 | Liu | H04B 7/0602 |
| 2017/0272141 A1* | 9/2017 | Horiuchi | H04L 5/0051 |
| 2018/0279145 A1* | 9/2018 | Jung | H04L 5/0051 |
| 2019/0190675 A1* | 6/2019 | Takeda | H04L 27/2602 |
| 2019/0199487 A1* | 6/2019 | Ko | H04L 27/2634 |
| 2019/0261281 A1 | 8/2019 | Jung et al. | |
| 2019/0273637 A1* | 9/2019 | Zhang | H04L 5/0051 |
| 2019/0281588 A1* | 9/2019 | Zhang | H04W 52/08 |
| 2019/0319823 A1 | 10/2019 | Akkarakaran et al. | |
| 2019/0349864 A1 | 11/2019 | Zhang et al. | |
| 2019/0349867 A1 | 11/2019 | Molavianjazi | |
| 2019/0373596 A1* | 12/2019 | Saito | H04B 7/06 |
| 2019/0380123 A1* | 12/2019 | Yang | H04L 5/0023 |
| 2020/0068497 A1 | 2/2020 | Gong et al. | |
| 2020/0314860 A1 | 10/2020 | Zhou et al. | |
| 2020/0344810 A1* | 10/2020 | Xiong | H04W 74/0833 |
| 2021/0160793 A1 | 5/2021 | Osawa et al. | |
| 2022/0191882 A1 | 6/2022 | Lee et al. | |
| 2022/0240269 A1 | 7/2022 | Minotani et al. | |
| 2022/0271890 A1 | 8/2022 | Grossmann et al. | |
| 2023/0087394 A1 | 3/2023 | Yuan et al. | |
| 2023/0156626 A1 | 5/2023 | Ling et al. | |

FOREIGN PATENT DOCUMENTS

| | | |
|---|---|---|
| CN | 110536399 A | 12/2019 |
| CN | 110831197 A | 2/2020 |
| CN | 110972251 A | 4/2020 |
| CN | 111052658 A | 4/2020 |
| WO | 2018080260 A1 | 5/2018 |
| WO | 2019027308 A1 | 2/2019 |
| WO | 2019230003 A1 | 12/2019 |
| WO | 2020034442 A1 | 2/2020 |

OTHER PUBLICATIONS

3rd Generation Partnership Proj , "Text proposals for enhancements on 1-15 Multi-TRP and panel Transmission", 3GPP Draft; RI-2001726, 3rd Generation Partnership Project (3GPP), Mobile Competence Centre; 650, Route Des Lucioles; F-06921 Sophia-Antipolis Cedex; France, vol. RAN WGl, Apr. 10, 2020, 12 pages.
202080100954.3 , "Foreign Office Action", CN Application No. 202080100954.3, Sep. 3, 2024, 18 pages.
Ericsson , "Enhancements to UL Configured Grant Transmission for NR URLLC", 3GPP TSG-RAN WG1 Meeting #99, R1-1911950, Reno, USA, Nov. 2019, 9 pages.
NTT Docomo, Inc. , "Draft CR for configured grant uplink transmission", 3GPP TSG-RAN WG1 Meeting #95, R1-1814142, Spokane, USA [retrieved Dec. 15, 2022]. Retrieved from the Internet <https://www.3gpp.org/ftp/tsg_ran/WG1_RL1/TSGR1_95/Docs/>., Nov. 2018, 5 Pages.
PCT/CN2020/091798 , "International Preliminary Report on Patentability", PCT Application No. PCT/CN2020/091798, Dec. 1, 2022, 5 pages.
PCT/CN2020/091798 , "International Search Report and Written Opinion", PCT Application No. PCT/CN2020/091798, Feb. 25, 2021, 6 pages.
"Foreign Office Action", CN Application No. 202080100954.3, Jan. 26, 2025, 16 pages.
"Non-Final Office Action", U.S. Appl. No. 17/920,612, Mar. 14, 2025, 14 pages.
"Foreign Office Action", CN Application No. 202080098671.X, Aug. 30, 2024, 31 pages.
"Extended European Search Report", EP Application No. 20932097.7, Dec. 7, 2023, 9 pages.
Huawei, et al., "Introduction of further NB-IoT enhancements other than EDT in TS 36.331", 3GPP TSG-RAN2 Meeting #103, R2-1811543, Gothenburg, Sweden, Aug. 2018, 77 pages.
Lenovo, et al., "Discussion of multi-TRP/panel transmission", 3GPP TSG RAN WG1 Meeting #99, R1- 1912316, Reno, USA [retrieved Jun. 15, 2022]. Retrieved from the Internet <https://portal.3gpp.org/ngppapp/TdocList.aspx?meeting Id=32827>, Nov. 2019, 11 pages.
"International Preliminary Report on Patentability", PCT Application No. PCT/CN2020/086121, Nov. 3, 2022, 5 pages.
"International Search Report and Written Opinion", PCT Application No. PCT/CN2020/086121, Jan. 20, 2021, 6 pages.
Vivo, "Further Discussion on Multi-TRP Transmission", 3GPP TSG RAN WG1 #96bis, R1-1904096, Xi'an, China [retrieved Dec. 12, 2023]. Retrieved from the Internet <https://www.3gpp.org/ftp/tsg_ran/WG1_RL1/TSGR1_96b/Docs>, Apr. 2019, 14 pages.

* cited by examiner

METHOD AND APPARATUS FOR POWER CONTROL OF CONFIGURED GRANT PUSCH REPETITION

TECHNICAL FIELD

Embodiments of the present disclosure generally relate to wireless communication technology, especially to a method and apparatus for power control of a configured grant physical uplink shared channel (PUSCH) repetition.

BACKGROUND

There is a work item description (WID) approved on multiple-input multiple-output (MIMO) in New Radio (NR) Release 17 (R17) which includes a research topic, that is, identifying and specifying features to improve reliability and robustness for channels other than physical downlink shared channel (PDSCH) (that is, physical downlink control channel (PDCCH), PUSCH, and physical uplink control channel (PUCCH)) using multi-transmit-receive point (TRP) and/or multi-panel, with Release 16 (R16) reliability features as the baseline.

In some existing procedures, in order to improve reliability and robustness, a same configured grant PUSCH transmission may be repeatedly transmitted for several times. PUSCH repetition(s) (or called configured grant PUSCH repetition(s)) of a configured grant PUSCH transmission with multiple beams/TRPs in multiple slots can utilize a spatial diversity of multiple beams/TRPs to increase the reliability and robustness, which will be studied and discussed in NR R17. Considering the PUSCH repetitions of the configured grant PUSCH transmission by using multiple beams may be received by multiple TRPs of a base station (BS), power control of the PUSCH repetitions of the configured grant PUSCH transmission should be different due to different links between a user equipment (UE) and different TRPs. Therefore, the power control of each PUSCH repetition of the configured grant PUSCH transmission with a different beam corresponding to a different TRP reception should be separately controlled and enhanced.

SUMMARY OF THE APPLICATION

Some embodiments of the present disclosure provide a method. The method may include receiving a configuration including a mapping pattern and a plurality of pathloss reference RS Ids for a configured grant physical uplink shared channel (PUSCH) transmission, which is configured to be transmitted in a plurality of time intervals repeatedly by higher layer signaling; determining a power of each PUSCH repetition of the configured grant PUSCH transmission based on the configuration; and transmitting the configured grant PUSCH transmission in the plurality of time intervals repeatedly based on the determined power of each PUSCH repetition of the configured grant PUSCH transmission and the mapping pattern.

In an embodiment of the present application, the plurality of pathloss reference RS Ids are configured in rrc-ConfiguredUplinkGrant included in configuredGrantConfig.

In an embodiment of the present application, the configuration further includes at least one sounding reference signal resource indicator (SRI) for indicating a plurality of sounding reference signal (SRS) resources for codebook based transmission or a plurality of SRS resource subsets for non-codebook based transmission. In an example, a plurality of SRI indicators are included in the configuration, and each SRS resource indicator of the plurality of SRI indicators indicates one SRS resource for codebook based transmission or one SRS resource subset for non-codebook based transmission. In another example, only one SRI indicator is included in the configuration, and the SRI indicator indicates a plurality of SRS resources for codebook based transmission or a plurality of SRS resource subsets for non-codebook based transmission.

In an embodiment of the present application, the configuration further includes at least one p0-PUSCH-Alpha Id. In an example, a plurality of p0-PUSCH-Alpha Ids are included in the configuration, and each p0-PUSCH-Alpha Id of the plurality of p0-PUSCH-Alpha Ids is associated with one indicated SRS resource of the plurality of SRS resources for codebook based transmission or one indicated SRS resource subset of the plurality of SRS resource subsets for non-codebook based transmission. In another example, only one p0-PUSCH-Alpha Id is included in the configuration, and the p0-PUSCH-Alpha Id is associated with the plurality of SRS resources for codebook based transmission or the plurality of SRS resource subsets for non-codebook based transmission.

In an embodiment of the present application, the configuration further includes at least one closed loop index. In an example, a plurality of closed loop indexes are included in the configuration, and each closed loop index of the plurality of closed loop indexes is associated with one indicated SRS resource of the plurality of SRS resources for codebook based transmission or one indicated SRS resource subset of the plurality of SRS resource subsets for non-codebook based transmission. In another example, only one closed loop index is included in the configuration, and the closed loop index is associated the plurality of SRS resources for codebook based transmission or the plurality of SRS resource subsets for non-codebook based transmission.

In an embodiment of the present application, each pathloss reference RS Id of the plurality of pathloss reference RS Ids is associated with one indicated SRS resource of the plurality of SRS resources for codebook based transmission or one indicated SRS resource subset of the plurality of SRS resource subsets for non-codebook based transmission.

In another embodiment of the present application, rrc-ConfiguredUplinkGrant is not included in configuredGrant-Config, and the method further includes: receiving a SRI field of an activated downlink control information (DCI) of the configured grant PUSCH transmission, wherein the SRI field includes at least one SRI value for indicating a plurality of SRS resources for codebook based transmission or a plurality of SRS resource subsets for non-codebook based transmission.

In another embodiment of the present disclosure, a plurality of SRI values are in the SRI field, and each SRI value indicates one SRS resource for codebook based transmission or one SRS resource subset for non-codebook based transmission.

In another embodiment of the present disclosure, the configuration further includes a plurality of SRI-PUSCH-PowerControl lists, a number of the plurality of SRI-PUSCH-PowerControl lists is the same as a number of the plurality of SRI values, and one pathloss reference RS Id of the plurality of pathloss reference RS Ids is configured for each SRI-PUSCH-PowerControl Id within each SRI-PUSCH-PowerControl list.

In another embodiment of the present disclosure, the pathloss reference RS Id is associated with an SRI value of plurality of SRI values, and the pathloss reference RS Id is indicated by mapping an SRI value to an associated SRI-PUSCH-PowerControl list of the plurality of SRI-PUSCH-PowerControl lists.

In another embodiment of the present disclosure, only one SRI value is in the SRI field, and the SRI value indicates a plurality of SRS resources for codebook based transmission or a plurality of SRS resource subsets for non-codebook based transmission.

In another embodiment of the present disclosure, the configuration further includes one SRI-PUSCH-PowerControl list, the plurality of pathloss reference RS Ids are configured for at least one SRI-PUSCH-PowerControl Id within the SRI-PUSCH-PowerControl list. The plurality of pathloss reference RS Ids are indicated by mapping the SRI value to the SRI-PUSCH-PowerControl list.

In another embodiment of the present disclosure, a number of the plurality of SRS resources for codebook based transmission or the plurality of SRS resource subsets for non-codebook based transmission is the same as a number of the plurality of pathloss reference RS Ids, and each SRS resource of the plurality of SRS resources for codebook based transmission or each SRS resource subset of the plurality of SRS resource subsets for codebook based transmission is associated with one pathloss reference RS Id of the plurality of pathloss reference RS Ids.

In another embodiment of the present disclosure, the configuration further includes at least one p0-PUSCH-Alpha Id. In an example, a plurality of p0-PUSCH-Alpha Ids are included in the configuration, and each p0-PUSCH-Alpha Id of the plurality of p0-PUSCH-Alpha Ids is associated with one indicated SRS resource of the plurality of SRS resources for codebook based transmission or one indicated SRS resource subset of the plurality of SRS resource subsets for non-codebook based transmission. In another example, only one p0-PUSCH-Alpha Id is included in the configuration, and the p0-PUSCH-Alpha Id is associated with the plurality of SRS resources for codebook based transmission or the plurality of SRS resource subsets for non-codebook based transmission.

In another embodiment of the present disclosure, the configuration further includes at least one closed loop index. In an example, a plurality of closed loop indexes are included in the configuration, and each closed loop index of the plurality of closed loop indexes is associated with one indicated SRS resource of the plurality of SRS resources for codebook based transmission or one indicated SRS resource subset of the plurality of SRS resource subsets for non-codebook based transmission. In another example, only one closed loop index is included in the configuration, and the closed loop index is associated with the plurality of SRS resources for codebook based transmission or the plurality of SRS resource subsets for non-codebook based transmission.

In embodiments of the present disclosure, the mapping pattern indicates each PUSCH repetition which the SRS resource for codebook based transmission or the SRS resource subset for non-codebook based transmission is associated with.

Some other embodiments of the present disclosure provide a method. The method may include: transmitting a configuration including a mapping pattern and a plurality of pathloss reference RS Ids for a configured grant physical uplink shared channel (PUSCH) transmission, which is configured to be transmitted in a plurality of time intervals repeatedly by higher layer signaling; and receiving the configured grant PUSCH transmission in the plurality of time intervals repeatedly according to the mapping pattern, wherein a power of each PUSCH repetition of the configured grant PUSCH transmission is determined based on the configuration.

Some other embodiments of the present disclosure provide an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above methods with the at least one receiver, the at least one transmitter and the at least one processor.

According to the embodiments of the present disclosure, the UE may determine the power of each PUSCH repetition of the configured grant PUSCH transmission when the configured grant PUSCH repetitions are transmitted by multiple beams at UE side for configured grant Type 1 PUSCH transmission and configured grant Type 2 PUSCH transmission.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings.

A wireless communication system generally includes one or more BSs and one or more UEs. Furthermore, a BS may be configured with one TRP (or panel) or some TRPs (or panels). A TRP can act like a small BS. The TRPs can communicate with each other by a backhaul link. Such backhaul link may be an ideal backhaul link or a non-ideal backhaul link. In a wireless communication system, one single TRP can be used to serve one or more UEs under control of a BS. In different scenario, TRP may be called in different terms. Persons skilled in the art should understand that as the 3GPP and the communication technology develop, the terminologies recited in the specification may change, which should not affect the scope of the present disclosure. It should be understood that the TRP(s) (or panel(s)) configured for the BS may be transparent to a UE.

Figure 1:
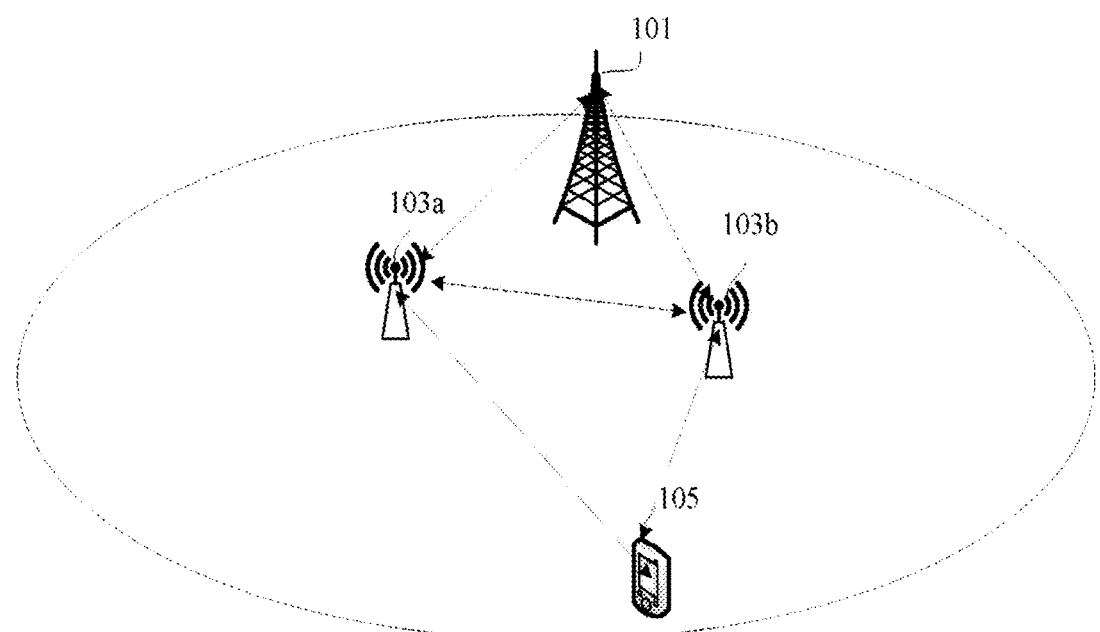
FIG. 1 is a schematic diagram illustrating an exemplary wireless communication system according to some embodiments of the present disclosure.

FIG. 1 is a schematic diagram illustrating an exemplary wireless communication system according to some embodiments of the present disclosure.

Referring to FIG. 1, a wireless communication system 100 may include a BS 101 and a UE 105. Furthermore, the BS 101 is further configured with two TRPs (e.g., TRP 103a and TRP 103b). Although only one BS, two TRPs, and one UE are shown for simplicity, it should be noted that the wireless communication system 100 may further include additional BSs, TRPs, and UEs.

The BS 101 may be a gNB in some scenarios (e.g. in 5G application scenario). The TRP 103a and TRP 103b may connect the BSs 101, via, for example, a backhaul link. Each TRP can serve the UE 105. As shown in FIG. 1, TRP 103a and TRP 103b can serve the UE 105 within a serving area or region (e.g., a cell or a cell sector). The TRP 103a and TRP 103b can communicate to each other via, for example, a backhaul link. It should be understood that the TRP 103a and TRP 103b configured for the BS 101 may be transparent to the UE 105.

In some embodiments of the present disclosure, the BS 101 may be distributed over a geographic region. In certain embodiments, the BS 101 may also be referred to as an access point, an access terminal, a base, a macro cell, a Node-B, an enhanced Node B (eNB), a gNB, a Home Node-B, a relay node, or any device described using other terminology used in the art.

The UE 105 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 105 may include wearable devices, such as smart watches, fitness bands, optical head-mounted displays, or the like. Moreover, the UE 105 may be referred to as a subscriber unit, a mobile phone, a mobile station, a user, a terminal, a mobile terminal, a wireless terminal, a fixed terminal, a subscriber station, a user terminal, or any device described using other terminology used in the art. The UE 105 may communicate directly with the BSs 102 via uplink communication signals.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G NR of the 3GPP protocol, wherein the BS 101 transmit data using an orthogonal frequency division multiplexing (OFDM) modulation scheme on the downlink and the UE 105 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BS 101 may communicate using other communication protocols, such as the IEEE 802.11 family of wireless communication protocols. Further, in some embodiments of the present application, the BS 101 may communicate over licensed spectrums, whereas in other embodiments, the BS 101 may communicate over unlicensed spectrums. The present application is not intended to be limited to the implementation of any particular wireless communication system architecture or protocol. In yet some embodiments of present application, the BS 101 may communicate with the UE 105 using the 3GPP 5G protocols.

As shown in FIG. 1, there are multiple links between the UE 105 and the TRPs 103a and 103b. The multiple links can be used for the UE 105 to transmit one or more configured grant PUSCH repetitions of a configured grant PUSCH transmission. Therefore, the power of a different link of a configured grant PUSCH repetition should be separately controlled and the power control of the configured grant PUSCH repetitions with multiple beams/TRPs should be enhanced.

In some embodiments, a sounding reference signal (SRS) is always configured within an SRS resource set consisting of one or more SRS resources. Several use cases have been identified for the SRS, and thus a radio resource control (RRC) configuration of an SRS resource set may contain a parameter called "usage". Depending on a value of the usage, the SRS resource set will have different configurations appropriate for the indicated use case, e.g., the number of allowed sets, the number of allowed resources per set, etc. The valid values of this parameter are antenna switching, codebook, non-codebook, and beam management.

According to Release 15 (R15) specification, there are two transmission schemes for a PUSCH transmission which are codebook based transmission and non-codebook based transmission, and can be applied for a configured grant PUSCH transmission. And both schemes for the configured grant PUSCH transmission are related to an SRS resource set whose usage is configured as 'codebook' or 'non-codebook'.

There are two types of configured grant PUSCH transmission, that is, configured grant Type 1 PUSCH transmission and configured grant Type 2 PUSCH transmission. The configured grant Type 1 PUSCH transmission is semi-statically configured to operate upon the reception of a higher layer parameter of configuredGrantConfig including rrc-ConfiguredUplinkGrant without the detection of an uplink (UL) grant in a DCI. The configured grant Type 2 PUSCH transmission is semi-persistently scheduled by an UL grant in a valid activated DCI according to Subclause 10.2 of [6, TS 38.213] after the reception of a higher layer parameter configuredGrantConfig not including rrc-ConfiguredUplinkGrant.

The power control procedure of a configured grant PUSCH transmission is drafted in TS 38.213 as follows:

7.1 Physical Uplink Shared Channel

For a PUSCH transmission on active UL BWP b, as described in Subclause 12, of carrier f of serving cell c, a UE first calculates a linear value $\hat{P}_{PUSCH,b,f,c}(i, j, q_d, l)$ of the transmit power $P_{PUSCH,b,f,c}(i, j, q_d, l)$, with parameters as defined in Subclause 7.1.1. For a PUSCH transmission scheduled by a DCI format 0_1 or configured by ConfiguredGrantConfig or semiPersistentOnPUSCH, if txConfig in PUSCH-Config is set to 'codebook' and each SRS resource in the SRS-ResourceSet with usage set to 'codebook' has more than one SRS port, the UE scales the linear value by the ratio of the number of antenna ports with a non-zero PUSCH transmission power to the maximum number of SRS ports supported by the UE in one SRS resource. The UE splits the power equally across the antenna ports on which the UE transmits the PUSCH with non-zero power.

7.1.1 UE Behaviour

If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i, j, q_d, l)$ in PUSCH transmission occasion i as $$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} [dBm]$$

where, $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

$P_{O\_PUSCH,b,f,c}(j)$ is a parameter composed of the sum of a component $P_{O\_NOMINAL\_PUSCH,f,c}(j)$ and a component $P_{O\_NOMINAL\_PUSCH,f,c}(j)$ where $j \in \{0, 1, \ldots, J-1\}$.

If a UE is not provided P0-PUSCH-AlphaSet or for a PUSCH transmission scheduled by an RAR UL grant as described in Subclause 8.3, j=0, $P_{O\_UE\_PUSCH,b,f,c}(0)=0$, and $P_{O\_NOMINAL\_PUSCH,f,c}(0) = P_{O\_PRE} + \Delta_{PREAMBLE\_Msg3}$, where the parameter preambleReceivedTargetPower [11, TS 38.321](for $P_{O\_PRE}$) and msg3-DeltaPreamble (for $\Delta_{PREAMBLE\_Msg3}$) are provided by higher layers, or $\Delta\Delta_{PREAMBLE\_Msg3}=0$ dB if msg3-DeltaPreamble is not provided, for carrier f of serving cell c For a PUSCH (re)transmission configured by ConfiguredGrantConfig, j=1, $P_{O\_NOMINAL\_PUSCH,f,c}(1)$ is provided by p0-NominalWithoutGrant, or $P_{O\_NOMINAL\_PUSCH,f,c}(1)$ $PP_{O\_NOMINAL\_PUSCH,f,c}(0)$ if p0-NominalWithoutGrant is not provided, and $P_{O\_UE\_PUSCH,b,f,c}(1)$ is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of serving cell c For $j \in \{2, \ldots, J-1\} = S_j$, a $P_{O\_NOMINAL\_PUSCH,f,c}(j)$ value, applicable for all $j \in S$, is provided by p0-NominalWithGrant, or $P_{O\_NOMINAL\_PUSCH,f,c}(j) = PP_{O\_NOMINAL\_PUSCH,f,c}(0)$ if p0-NominalWithGrant is not provided, for each carrier f of serving cell C and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c If the UE is provided by SRI-PUSCH-PowerControl more than one values of p0-PUSCH-AlphaSetId and if DCI format 0_1 includes an SRI field, the UE obtains a mapping from sri-PUSCH-PowerControlId in SRI-PUSCH-PowerControl between a set of values for the SRI field in DCI format 0_1 [5, TS 38.212] and a set of indexes provided by p0-PUSCH-AlphaSetId that map to a set of P0-PUSCH-AlphaSet values. If the PUSCH transmission is scheduled by a DCI format 0_1 that includes an SRI field, the UE determines the value of $P_{O\_UE\_PUSCH,b,f,c}(j)$ from the p0-PUSCH-AlphaSetId value that is mapped to the SRI field value If the PUSCH transmission is scheduled by a DCI format 0_0 or by a DCI format 0_1 that does not include an SRI field, or if SRI-PUSCHPowerControl is not provided to the UE, j=2, and the UE determines $P_{O\_UE\_PUSCH,b,f,c}(j)$ from the value of the first P0-PUSCH-AlphaSet in p0-AlphaSets For $\alpha_{b,f,c}(j)$ For j=0, $\alpha_{b,f,c}(0)$ is a value of msg3-Alpha, when provided; otherwise, $\alpha_{b,f,c}=(0)=1$ For j=1, $\alpha_{b,f,c}(1)$ is provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell c For $j \in S_j$, a set of $\alpha_{b,f,c}(j)$ values are provided by a set of alpha in P0-PUSCH-AlphaSet indicated by a respective set of p0-PUSCH-AlphaSetId for active UL BWP b of carrier f of serving cell c If the UE is provided SRI-PUSCH-PowerControl and more than one values of p0-PUSCH-AlphaSetId, and if DCI format 0_1 includes an SRI field, the UE obtains a mapping from sri-PUSCH-PowerControlId in SRI-PUSCH-PowerControl between a set of values for the SRI field in DCI format 0_1 [5, TS 38.212] and a set of indexes provided by p0-PUSCH-AlphaSetId that map to a set of P0-PUSCH-AlphaSet values. If the PUSCH transmission is scheduled by a DCI format 0_1 that includes an SRI field, the UE determines the values of $\alpha_{b,f,c}(j)$ from the p0-PUSCH-AipharSetId value that is mapped to the SRI field value If the PUSCH transmission is scheduled by a DCI format 0_0 or by a DCI format 0_1 that does not include an SRI field, or if SRI-PUSCH-PowerControl is not provided to the UE, j=2, and the UE determines $\alpha_{b,f,c}(j)$ from the value of the first P0-PUSCH-AlphaSet in p0-AlphaSets $M_{RB,f,c}^{PUSCH}(i)$ is the bandwidth of the PUSCH resource assignment expressed in number of resource blocks for PUSCH transmission occasion i on active UL BWP b of carrier f of serving cell c and µ is an SCS configuration defined in [4, TS 38.211]

$PL_{b,f,c}(q_d)$ is a downlink pathloss estimate in dB calculated by the UE using reference signal (RS) index $q_d$ for the active DL BWP, as described in Subclause 12, of carrier f of serving cell c If the UE is not provided PUSCH-PathlossReferenceRS or before the UE is provided dedicated higher layer parameters, the UE calculates $PL_{b,f,c}(q_d)$ using an RS resource from the SS/PBCH block that the UE uses to obtain MIB If the UE is configured with a number of RS resource indexes, up to the value of maxNrof PUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to an SS/PBCH block index, and a set of CSI-RS resource indexes, each provided by csi-RS-Index when a value of a corresponding pusch-PathlossReferenceRS-Id maps to a CSI-RS resource index. The UE identifies an RS resource index $q_d$ in the set of RS resource indexes to correspond either to an SS/PBCH block index or to a CSI-RS resource index as provided by pusch-PathlossReferenceRS-Id in PUSCH-PathlossReferenceRS If the PUSCH transmission is scheduled by an RAR UL grant as described in Subclause 8.3, the UE uses the same RS resource index $q_d$ as for a corresponding PRACH transmission If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field in DCI format 0_1 and a set of PUSCH-PathlossReferenceRS-Id values. If the PUSCH transmission is scheduled by a DCI format 0_1 that includes an SRI field, the UE determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking If the PUSCH transmission is scheduled by a DCI format 0_0, and if the UE is provided a spatial setting by PUCCH-SpatialRelationInfo for a PUCCH resource with a lowest index for active UL BWP b of each carrier f and serving cell c, as described in Subclause 9.2.2, the UE uses the same RS resource index $q_d$ as for a PUCCH transmission in the PUCCH resource with the lowest index If the PUSCH transmission is scheduled by a DCI format 0_0 and if the UE is not provided a spatial setting for a PUCCH transmission, or by a DCI format 0_1 that does not include an SRI field, or if SRI-PUSCH-PowerControl is not provided to the UE, the UE determines an RS resource index $q_d$ with a respective PUSCH-PathlossReferenceRS-Id value being equal to zero where the RS resource is either on serving cell c or, if provided, on a serving cell indicated by a value of pathlossReferenceLinking For a PUSCH transmission configured by ConfiguredGrantConfig, if rrc-ConfiguredUplinkGrant is included in ConfiguredGrantConfig, an RS resource index $q_d$ is provided by a value of pathlossReferenceIndex included in rrc-ConfiguredUplinkGrant where the RS resource is either on serving cell c or, if provided, on a serving cell indicated by a value of pathlossReferenceLinking For a PUSCH transmission configured by ConfiguredGrantConfig that does not include rrc-ConfiguredUplinkGrant, the UE determines an RS resource index $q_d$ from a value of PUSCH-PathlossReferenceRS-Id that is mapped to an SRI field value in a DCI format activating the PUSCH transmission. If the DCI format activating the PUSCH transmission does not include an SRI field, the UE determines an RS resource index $q_d$ with a respective PUSCH-PathlossReferenceRS-Id value being equal to zero where the RS resource is either on serving cell c or, if provided, on a serving cell indicated by a value of pathlossReferenceLinking $PL_{b,f,c}(q_d)$=referenceSignalPower−higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-BlockPower. If the UE is configured periodic CSI-RS reception, referenceSignalPower is provided either by ss-PBCH-BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

$\Delta_{TF,b,f,c}(i)=10 \log_{10}((2^{BPREK} -1)\cdot\beta_{offset}^{PUSCH})$ for $K_S=1.25$ and $\Delta T_{b,f,c}(i)=0$ for $K_S=0$ where $K_S$ is provided by deltaMCS for each UL BWP b of each carrier f and serving cell c. If the PUSCH transmission is over more than one layer [6, TS 38.214], $\Delta_{TFb,f,c}(i)=0$. $\beta_{offset}^{PUSCH}$, for active UL BWP b of each carrier f and each serving cell c, are computed as below $$BPRE = \sum_{r=0}^{C-1} K_r/N_{RE}$$

for PUSCH with UL-SCH data and BPRE=$Q_m \cdot R/\beta_{offset}^{PUSCH}$ for CSI transmission in a PUSCH without UL-SCH data, where c is a number of transmitted code blocks, $K_r$ is a size for code block r, and $N_{RE}$ is a number of resource elements determined as $$N_{RE} = M_{RB,b,f,c}^{PUSCH}(i) \cdot \sum_{j=0}^{N_{symb,b,f,c(i)}^{PUSCH}-1} N_{sc,data}^{RB}(i, j),$$

where $N_{symb,b,f,c}^{PUSCH}(i)$ is a number of symbols for PUSCH transmission occasion i on active UL BWP b of carrier f of serving cell c, $N_{sc,data}^{RB}(i,$ j) is a number of subcarriers excluding DM-RS subcarriers and phase-tracking RS samples [4, TS 38.211] in PUSCH symbol j, $0 \leq j < N_{symb,b,f,c}^{PUSCH}(i)$, and c, K, are defined in [5, TS 38.212]

$\beta_{offset}^{PUSCH}=1$ when the PUSCH includes UL-SCH data and $\beta_{offset}^{PUSCH}=\beta_{offset}^{CSI,1}$, as described in Subclause 9.3, when the PUSCH includes CSI and does not include UL-SCH data $Q_m$ is the modulation order and R is the target code rate, as described in [6, TS 38.214], provided by the DCI format scheduling the PUSCH transmission that includes CSI and does not include UL-SCH data For the PUSCH power control adjustment state $f_{b,f,c}(i, l)$ for active UL BWP b of carrier f of serving cell c in PUSCH transmission occasion i $\delta_{PUSCH,\ b,f,c}(i, l)$ is a TPC command value included in a DCI format 0_0 or DCI format 0_1 that schedules the PUSCH transmission occasion i on active UL BWP b of carrier f of serving cell c or jointly coded with other TPC commands in a DCI format 2_2 with CRC scrambled by TPC-PUSCH-RNTI, as described in Subclause 11.3

$l \in \{0, 1\}$ if the UE is configured with twoPUSCH-PC-AdjustmentStates and $l=0$ if the UE is not configured with twoPUSCH-PC-AdjustmentStates or if the PUSCH transmission is scheduled by an RAR UL grant as described in Subclause 8.3

For a PUSCH (re)transmission configured by ConfiguredGrantConfig, the value of $l \in \{0, 1\}$ is provided to the UE by powerControlLoopToUse If the UE is provided SRI-PUSCH-PowerControl, the UE obtains a mapping between a set of values for the SRI field in DCI format 0_1 and the l value(s) provided by sri-PUSCH-ClosedLoopIndex. If the PUSCH transmission is scheduled by a DCI format 0_1 and if DCI format 0_1 includes an SRI field, the UE determines the l value that is mapped to the SRI field value If the PUSCH transmission is scheduled by a DCI format 0_0 or by a DCI format 0_1 that does not include an SRI field, or if an SRI-PUSCH-PowerControl is not provided to the UE, $l=0$ If the UE obtains one TPC command from a DCI format 2_2 with CRC scrambled by a TPC-PUSCH-RNTI, the l value is provided by the closed loop indicator field in DCI format 2_2

$$f_{b,f,c}(i, l) = f_{b,f,c}(i - i_0, l) + \sum_{m=0}^{C(D_i)-1} \delta_{PUSCH,b,f,c}(m, l)$$

is the PUSCH power control adjustment state l for active UL BWP b of carrier f of serving cell c and PUSCH transmission occasion i if the UE is not provided tpc-Accumulation, where The $\delta_{PUSCH b,f,c}$ values are given in Table 7.1.1-1

$$\sum_{m=0}^{C(D_i)-1} \delta_{PUSCH,b,f,c}(m, l)$$

is a sum of TPC command values in a set $D_i$ of TPC command values with cardinality $c(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0 > 0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i If a PUSCH transmission is scheduled by a DCI format 0_0 or DCI format 0_1, KUSCH (i) is a number of symbols for active UL BWP b of carrier f of serving cell c after a last symbol of a corresponding PDCCH reception and before a first symbol of the PUSCH transmission If a PUSCH transmission is configured by ConfiguredGrantConfig, $K_{PUSCH}(i)$ is a number of $K_{PUSCH,min}$ symbols equal to the product of a number of symbols per slot, $N_{symb}^{slot}$, and the minimum of the values provided by k2 in PUSCH-ConfigCommon for active UL BWP b of carrier f of serving cell c If the UE has reached maximum power for active UL BWP b of carrier f of serving cell c at PUSCH transmission occasion $i-i_0$ and $$\sum_{m=0}^{C(D_i)-1} \delta_{PUSCH,b,f,c}(m, l) \geq 0,$$

then $f_{b,f,c}(i, l)=f_{b,f,c}(i-i_0, l)$

If UE has reached minimum power for active UL BWP b of carrier f of serving cell c at PUSCH transmission occasion $i-i_0$ and $$\sum_{m=0}^{C(D_i)-1} \delta_{PUSCH,b,f,c}(m, l) \leq 0,$$

then $f_{b,f,c}(i, l)=f_{b,f,c}(i-i_0, l)$

A UE resets accumulation of a PUSCH power control adjustment state l for active UL BWP b of carrier f of serving cell c to $f_{b,f,c}(k, l)=0$, $k=0, 1, \ldots, i$ If a configuration for a corresponding $P_{O\_UE\_PUSCH,b,f,c}(j)$ value is provided by higher layers If a configuration for a corresponding $\alpha_{b,f,c}(j)$ value is provided by higher layers If $j>1$ and the PUSCH transmission is scheduled by a DCI format 0_1 that includes an SRI field, and the UE is provided higher SRI-PUSCH-PowerControl, the UE determines the value of l from the value of j based on an indication by the SRI field for an sri-PUSCH-PowerControlId value associated with the sri-P0-PUSCH-AlphaSetId value corresponding to j and with the sri-PUSCH-ClosedLoopIndex value corresponding to l If $j>1$ and the PUSCH transmission is scheduled by a DCI format 0_0 or by a DCI format 0_1 that does not include an SRI field or the UE is not provided SRI-PUSCH-PowerControl, $l=0$ If j=1, l is provided by the value of powerControlLoopToUse $f_{b,f,c}(i, l) = \delta_{PUSCH,b,f,c}(i, l)$ is the PUSCH power control adjustment state for active UL BWP b of carrier f of serving cell c and PUSCH transmission occasion i if the UE is provided tpc-Accumulation, where $\delta_{PUSCH,b,f,c}$ absolute values are given in Table 7.1.1-1

If the UE receives a random access response message in response to a PRACH transmission on active UL BWP b of carrier f of serving cell c as described in Subclause 8

$f_{b,f,c}(0, l) = \Delta_{rampupmb,f,c} + \delta_{msg2,b,f,c}$, where l=0 and $\delta_{msg2,b,f,c}$ is a TPC command value indicated in the random access response grant of the random access response message corresponding to the PRACH transmission on active UL BWP b of carrier f in the serving cell c, and $$\Delta P_{rampup,b,f,c} = \min\left[\left\{\max\left(0, P_{CMAX,f,c} - \left(\begin{array}{c}10\log_{10}(2^\mu \cdot M_{RB,b,f,c}^{PUSCH}(0)) + \\ P_{O\_PUSCH,b,f,c}(0) + \alpha_{b,f,c}(0) \cdot PL_c + \\ \Delta_{TF,b,f,c}(0) + \delta_{msg2,b,f,c}\end{array}\right)\right)\right\}, \Delta P_{rampuprequested,b,f,c}\right]$$

and $\Delta P_{rampuprequested,b,f,c}$ is provided by higher layers and corresponds to the total power ramp-up requested by higher layers from the first to the last random access preamble for carrier f in the serving cell c, $M_{RB,b,f,c}^{PUSH}(0)$ is the bandwidth of the PUSCH resource assignment expressed in number of resource blocks for the first PUSCH transmission on active UL BWP b of carrier f of serving cell c, and $\Delta_{TF,b,f,c}(0)$ is the power adjustment of first PUSCH transmission on active UL BWP b of carrier f of serving cell c.

Table 7.1.1-1 shows mapping of TPC Command Field in DCI format 0_0, DCI format 0_1, or DCI format 2_2, with CRC scrambled by TPC-PUSCH-RNTI, or DCI format 2_3, to absolute and accumulated $\delta_{PUSCH,b,f,c}$ values or $\delta_{SRS,b,f,c}$ values.

TABLE 7.1.1-1

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | −1 | −4 |
| 1 | 0 | −1 |
| 2 | 1 | 1 |
| 3 | 3 | 4 |

It should be noted that for power control of a configured grant PUSCH transmission, power control parameters including p0-PUSCH-Alpha Id, pathloss reference RS Id and closed loop index are configured by RRC signaling which is drafted in TS 38.331 as follows.

```
ConfiguredGrantConfig ::=        SEQUENCE {
    frequency Hopping               ENUMERATED {intraSlot, interSlot}
OPTIONAL, -- Need S
    cg-DMRS-Configuration           DMRS-UplinkConfig,
    mcs-Table                       ENUMERATED {qam256, qam64LowSE}
OPTIONAL, -- Need S
    mcs-Table TransformPrecoder     ENUMERATED {qam256, qam64LowSE}
OPTIONAL, -- Need S
    uci-OnPUSCH                     SetupRelease { CG-UCI-OnPUSCH }
OPTIONAL, -- Need M
    resource Allocation             ENUMERATED { resourceAllocationType0,
resourceAllocationType1, dynamicSwitch },
    rbg-Size                        ENUMERATED {config2}
OPTIONAL, -- Need S
    powerControlLoopToUse           ENUMERATED {n0, n1},
    p0-PUSCH-Alpha                  P0-PUSCH-AlphaSetId,
    transformPrecoder               ENUMERATED {enabled, disabled}
OPTIONAL, -- Need S
    nrofHARQ-Processes              INTEGER(1..16),
    repK                            ENUMERATED {n1, n2, n4, n8},
    repK-RV                         ENUMERATED {s1-0231, s2-0303, s3-0000}
OPTIONAL, - Need R
    periodicity                     ENUMERATED {ym2, sym7, symlx14, sym2x14,
sym4x14, sym5x14, sym8x14, sym10x14, sym16x14, sym20x14, sym32x14, sym40x14,
sym64x14, sym80x14, sym128x14, sym160x14, sym256x14, sym320x14, sym512x14,
sym640x14, sym1024x14, sym1280x14, sym2560x14, sym5120x14,
sym640x14, sym1024x14, sym1280x14, sym2560x14, sym5120x14,
sym6, symlx12, sym2x12, sym4x12, sym5x12, sym8x12, sym10x12, sym16x12, sym20x12,
sym32x12, sym40x12, sym64x12, sym80x12, sym128x12, sym160x12, sym256x12, sym320x12,
sym512x12, sym640x12, sym1280x12, sym2560x12},
    configuredGrantTimer            INTEGER (1..64)
OPTIONAL, -- Need R
    rrc-ConfiguredUplinkGrant       SEQUENCE {
        timeDomainOffset                INTEGER (0..5119),
        timeDomainAllocation            INTEGER (0..15),
        frequency DomainAllocation      BIT STRING (SIZE(18)),
        antennaPort                     INTEGER (0..31),
        dmrs-SeqInitialization          INTEGER (0..1)        OPTIONAL, --
Need R
        precodingAndNumberOfLayers      INTEGER (0..63),
        srs-ResourceIndicator           INTEGER (0..15) OPTIONAL,
```

```
-- Need R
    mcsAndTBS                                            INTEGER (0..31),
    frequency HoppingOffset                              INTEGER
(1..maxNrofPhysicalResourceBlocks-1)   OPTIONAL,             -- Need R
    pathlossReferenceIndex                               INTEGER (0..maxNrofPUSCH-
PathlossReferenceRSs-1),
    ...
}
OPTIONAL, -- Need R
    ...
}
CG-UCI-OnPUSCH ::= CHOICE {
    dynamic                                              SEQUENCE (SIZE (1..4)) OF BetaOffsets,
    semiStatic                                           BetaOffsets
}
```

In R16, PDSCH repetitions with multiple beams have already been supported in the single DCI based multiple TRPs case, which implies that the backhaul of multiple TRPs is ideal or almost ideal. In the present application, we consider that configured grant PUSCH repetitions with multiple beams also works in the single DCI based multiple TRPs case.

Figure 2:
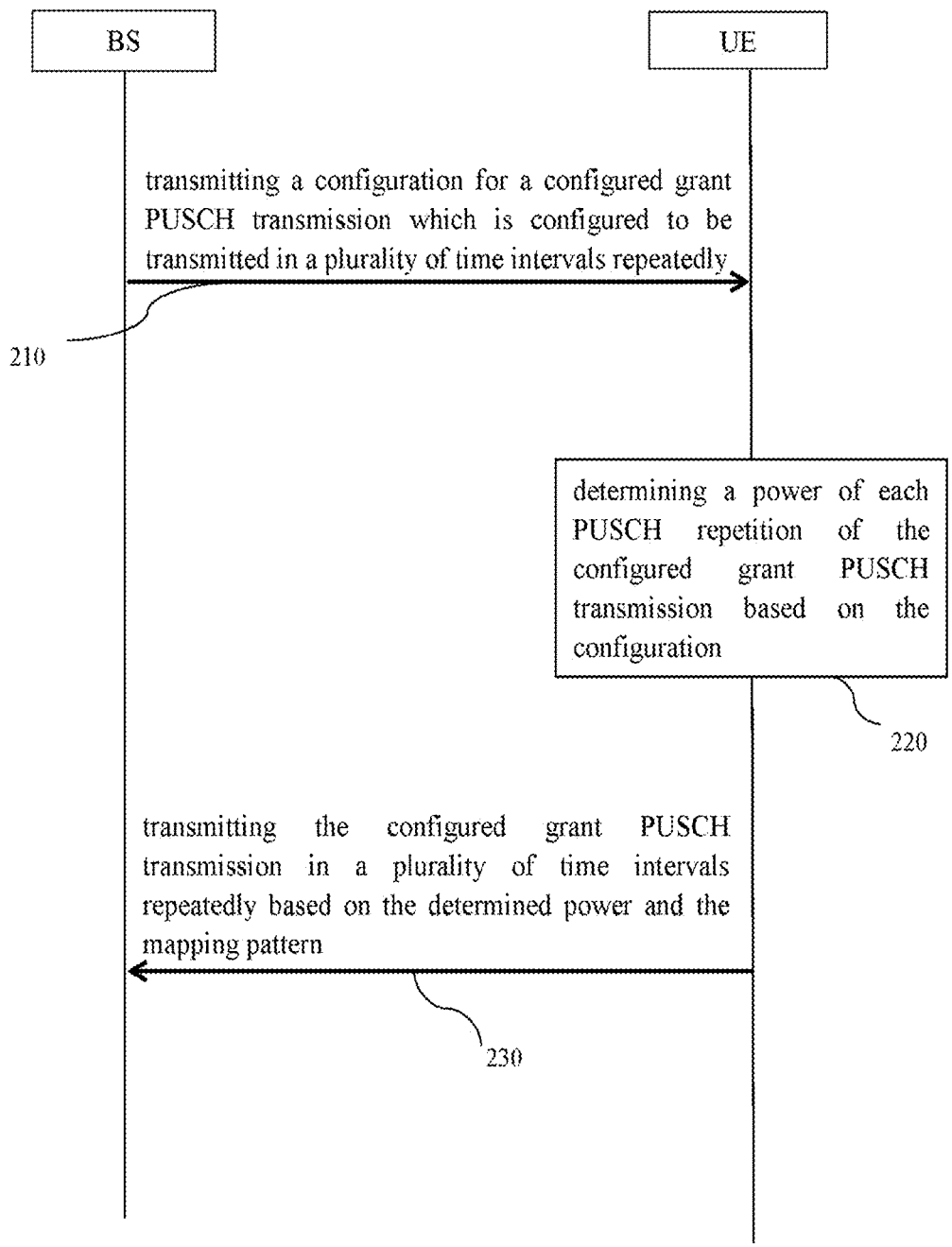
FIG. 2 is an exemplary flow chart illustrating a method for power control of a configured grant PUSCH repetition according to some embodiments of the present application.

FIG. 2 is an exemplary flow chart illustrating a method for power control of configured grant PUSCH repetition according to some embodiments of the present application.

As shown in FIG. 2, in step 210, a BS may transmit a configuration for a configured grant PUSCH transmission which is configured to be transmitted in a plurality of time intervals repeatedly by higher layer signaling, for example, RRC signaling. More details on the RRC signaling will be illustrated later. The configuration may include a mapping pattern and a plurality of pathloss reference RS Ids. The mapping pattern may indicate each PUSCH repetition which an SRS resource for codebook based transmission or an SRS resource subset for non-codebook based transmission is associated with. The pathloss reference RS Id is a power control parameter. Besides the pathloss reference RS Id, the BS may further transmit other power control parameters to UE, such as p0-PUSCH-Alpha Id and closed loop index, which will be described in detail later.

After receiving the configuration, in step 220, the UE may determine a power of each PUSCH repetition of the configured grant PUSCH transmission based on the configuration.

In step 230, the UE may transmit the configured grant PUSCH transmission in the plurality of time intervals repeatedly based on the determined power of each PUSCH repetition of the configured grant PUSCH transmission and the mapping pattern.

We will describe the power control of configured grant PUSCH repetition with respect to the two types of configured grant Type 1 PUSCH transmission and configured grant Type 2 PUSCH transmission, respectively in connection with the exemplary embodiments of the present application. Power Control of Configured Grant Type 1 PUSCH Repetition For a codebook based PUSCH transmission, an SRS resource in an SRS resource set with usage set as 'codebook' is indicated by an SRS resource indicator (SRI) configured in rrc-ConfiguredUplinkGrant which is associated with the configured grant PUSCH transmission. For non-codebook based PUSCH transmission, a subset of SRS resources in an SRS resource set with usage set as 'non-codebook' are indicated by an SRS resource indicator configured in rrc-ConfiguredUplinkGrant which is associated with the configured grant PUSCH transmission. And the power control parameters are configured in configuredGrantConfig whose detail signaling is drafted in TS 38.331 as described above.

In the present application, in order to support configured grant Type 1 PUSCH repetitions with multiple beams, the SRS resource indicator configured in rrc-ConfiguredUplinkGrant can be enhanced to indicate multiple SRS resources for codebook based transmission or multiple SRS resource subsets for non-codebook based transmission. It is agreed in R17 that a UE can be implemented with multiple panels which can transmit multiple beams but only one panel can be used for transmitting in a time interval considering the power consumption, which means only one beam can be used to transmit a PUSCH transmission at a time. And it is assumed that multiple SRS resource sets can be configured with the usage set to 'codebook' or 'non-codebook' where each SRS resource set can be associated with a panel.

For configured grant Type 1 PUSCH repetition according to embodiments of present application, two schemes may be adopted to indicate multiple beams associated with multiple SRS resources for codebook based transmission or multiple SRS resource subsets for non-codebook based transmission by enhancing the configuration of SRS resource indicator, for example, the SRS resource indicator configured in rrc-ConfiguredUplinkGrant.

For example, one scheme is that multiple SRS resource indicators are configured where each SRS resource indicator is used to indicate one SRS resource for codebook based transmission or one SRS resource subset for non-codebook based transmission. The other scheme is that one enhanced SRS resource indicator is configured where the enhanced SRI can indicate multiple SRS resources for codebook based transmission or multiple SRS resource subsets for non-codebook based transmission.

Furthermore, the power control parameters including p0-PUSCH-Alpha Id, pathloss reference RS Id and closed loop index may be also configured by the higher layer signaling, for example, RRC signaling.

For example, considering the links between a UE to different TRPs are different and independent, multiple pathloss reference RS Ids are configured in rrc-ConfiguredUplinkGrant included in configuredGrantConfig with one to one mapping (or associated) with an indicated SRS resources for codebook based transmission or an indicated SRS resource subsets for non-codebook based transmission.

Besides, p0-PUSCH-Alpha Id (s) can be configured in configuredGrantConfig. In an embodiment, multiple p0-PUSCH-Alpha Ids can be configured in configuredGrantConfig with one to one mapping (or associated)

with an indicated SRS resources for codebook based transmission or an indicated SRS resource subsets for non-codebook based transmission. In another embodiment, only one p0-PUSCH-Alpha Id can be configured in configuredGrantConfig, and the p0-PUSCH-Alpha Id is applied to (or associated with) all the indicated SRS resources for codebook based transmission or all the indicated SRS resource subsets for non-codebook based transmission.

Similarly, closed loop index(es) can be configured in configuredGrantConfig. 1n an embodiment, multiple closed loop indexes can be configured in configuredGrantConfig with one to one mapping (or associated) with an indicated SRS resources for codebook based transmission or an indicated SRS resource subsets for non-codebook based transmission. In another embodiment, only one closed loop index is configured in configuredGrantConfig, and the closed loop index is applied to (or associated with) all the indicated SRS resources for codebook based transmission or SRS resource subsets for non-codebook based transmission.

Furthermore, a mapping pattern (or called a beam mapping pattern) is configured by higher layer signaling (for example, RRC signaling) to indicate each repetition of a configured grant PUSCH transmission is associated with which SRS resource for codebook based transmission or SRS resource subset for non-codebook based transmission indicated by the multiple SRS resource indicators or the enhanced SRS resource indicator.

Therefore, according to the above analysis, each SRS resource for codebook based transmission or SRS resource subset for non-codebook based transmission is associated with a corresponding power control parameter set including a pathloss reference RS Id, a p0-PUSCH-Alpha Id (power offset (p0-PUSCH) and compensation factor (alpha)) and a closed loop index. Therefore, a UE can determine a power of each repetition of a configured grant PUSCH transmission based on the corresponding power control parameter set.

Scenarios of power control of configured grant Type 1 PUSCH repetition are provided as below for illustrative purpose according to some embodiments of the present application in connection with FIGS. 3 and 4, by taking 2 beams of the UE for transmitting a configured grant PUSCH transmission with multiple repetitions.

Figure 3:
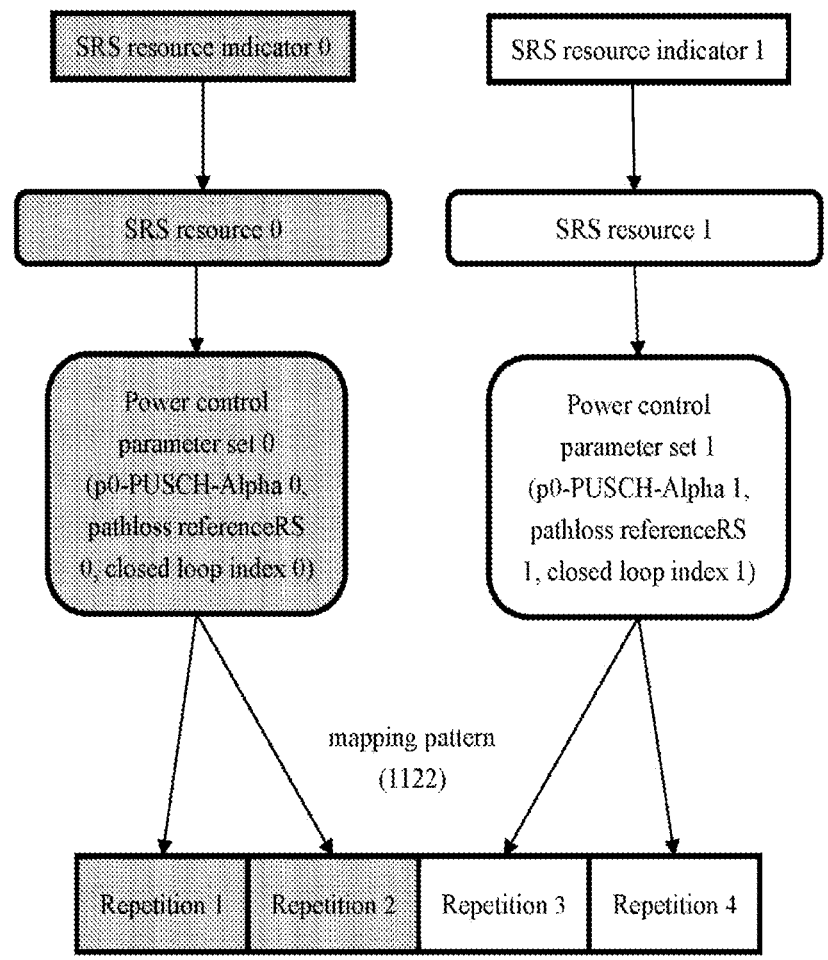
FIG. 3 illustrates an exemplary scenario of power control of a configured grant Type 1 PUSCH repetition according to an embodiment of the present disclosure.

FIG. 3 illustrates an exemplary scenario of power control of a configured grant Type 1 PUSCH repetition according to an exemplary embodiment of the present disclosure.

In this exemplary scenario, it is assumed that a configured grant Type 1 PUSCH transmission with codebook based transmission is configured to be transmitted repeatedly in 4 slots.

In this exemplary embodiment, a UE may receive RRC signaling from a BS, for example, the RRC signaling configures two SRS resource indicators, power control parameters including two p0-PUSCH-Alpha Ids, two pathloss referenceRS Ids, and two closed loop indexes, and a mapping pattern, and is shown as follows:

```
ConfiguredGrantConfig ::=                SEQUENCE {
    frequency Hopping                        ENUMERATED {intraSlot, interSlot}
OPTIONAL, -- Need S
    cg-DMRS-Configuration                    DMRS-UplinkConfig,
    mcs-Table                                ENUMERATED {qam256, qam64LowSE}
OPTIONAL, -- Need S
    mcs-TableTransformPrecoder               ENUMERATED {qam256, qam64LowSE}
OPTIONAL, -- Need S
    uci-OnPUSCH                              SetupRelease { CG-UCI-OnPUSCH }
OPTIONAL, -- Need M
    resource Allocation                      ENUMERATED { resourceAllocationType0,
resourceAllocationType1, dynamicSwitch },
    rbg-Size                                 ENUMERATED {config2}
OPTIONAL, -- Need S
    powerControlLoopToUse                    ENUMERATED {n0, n1},
    powerControlLoopToUse1                   ENUMERATED {n0, n1},          OPTIONAL,
    p0-PUSCH-Alpha                           P0-PUSCH-AlphaSetId,
    p0-PUSCH-Alpha1                          P0-PUSCH-AlphaSetId,          OPTIONAL,
    beamMappingPattern                       ENUMERATED {cyclicMapping,
sequenticalMapping}
    transformPrecoder                    ENUMERATED {enabled, disabled}
OPTIONAL, -- Need S
    nrofHARQ-Processes                       INTEGER(1..16),
    repK                                     ENUMERATED {n1, n2, n4, n8},
    repK-RV                                  ENUMERATED {s1-0231, s2-0303, s3-0000}
OPTIONAL, -- Need R
    periodicity                              ENUMERATED {ym2, sym7, sym1x14, sym2x14,
sym4x14, sym5x14, sym8x14, sym10x14, sym16x14, sym20x14, sym32x14, sym40x14,
sym64x14, sym80x14, sym128x14, sym160x14, sym256x14, sym320x14, sym512x14,
sym640x14, sym1024x14, sym1280x14, sym2560x14, sym5120x14,
sym640x14, sym1024x14, sym1280x14, sym2560x14, sym5120x14,
sym6, sym1x12, sym2x12, sym4x12, sym5x12, sym8x12, sym10x12, sym16x12, sym20x12,
sym32x12, sym40x12, sym64x12, sym80x12, sym128x12, sym160x12, sym256x12, sym320x12,
sym512x12, sym640x12, sym1280x12, sym2560x12},
    configuredGrantTimer                     INTEGER (1..64)
OPTIONAL, -- Need R
    rrc-ConfiguredUplinkGrant                SEQUENCE {
        timeDomainOffset                         INTEGER (0..5119),
        timeDomainAllocation                     INTEGER (0..15),
        frequency DomainAllocation               BIT STRING (SIZE(18)),
        antennaPort                              INTEGER (0..31),
        dmrs-SeqInitialization                   INTEGER (0..1)         OPTIONAL, --
Need R
        precodingAndNumberOfLayers               INTEGER (0..63),
        srs-ResourceIndicator                    INTEGER (0..15)              OPTIONAL,
```

```
-- Need R
    srs-ResourceIndicator1              INTEGER (0..15)              OPTIONAL,
-- Need R
    mcsAndTBS                           INTEGER (0..31),
    frequency HoppingOffset             INTEGER
(1..maxNrofPhysicalResourceBlocks-1)    OPTIONAL, -- Need R
    pathlossReferenceIndex              INTEGER (0..maxNrofPUSCH-
PathlossReferenceRSs-1)
    pathlossReferenceIndex1             INTEGER (0..maxNrofPUSCH-
PathlossReferenceRSs-1),
    ...
    }
OPTIONAL, -- Need R
    ...
}
```

As shown in the above RRC signaling and FIG. 3, two SRS resource indicators, e.g., srs-ResourceIndicator and srs-ResourceIndicator1 (corresponding to SRS resource indicator 0 and SRS resource indicator 1 in FIG. 3) are configured in rrc-ConfiguredUplinkGrant to indicate two SRS resources, e.g., first SRS resource (SRS resource 0 in FIG. 3) and second SRS resource (SRS resource 1 in FIG. 3).

Besides, two pathloss reference RS Ids, e.g., pathlossReferenceIndex and pathlossReferenceIndex1 (corresponding to pathloss reference RS 0 and pathloss reference RS 1 in FIG. 3) are configured in rrc-ConfiguredUplinkGrant. Two p0-PUSCH-Alpha Ids, e.g., p0-PUSCH-Alpha and p0-PUSCH-Alpha1 (corresponding to p0-PUSCH-Alpha 0 and p0-PUSCH-Alpha 1 in FIG. 3) and two closed loop indexes, e.g., powerControlLoopToUse and powerControlLoopToUse1 (corresponding to closed loop index 0 and closed loop index 1 in FIG. 3) are configured in ConfiguredGrantConfig.

As described above, a first power control parameter set (power control parameter set 0 in FIG. 3) composed of pathloss reference RS 0, p0-PUSCH-Alpha 0 and closed loop index 0 is associated with the first SRS resource (SRS resource 0). And a second power control parameter set (power control parameter set 1 in FIG. 3) composed of pathloss reference RS 1, p0-PUSCH-Alpha 1 and closed loop index 1 is associated with the second SRS resource (SRS resource 1).

Besides, a mapping pattern, e.g., beamMappingPattern (corresponding to mapping pattern in FIG. 3) is configured in ConfiguredGrantConfig. In this exemplary scenario, as show in FIG. 3, it is assumed that the mapping pattern is 1122, which means the first SRS resource (SRS resource 0) for codebook based transmission indicated by the first SRS resource indicator (SRS resource indicator 0) is associated with the transmission of the first and second configured grant PUSCH repetitions (e.g., repetition 1 and repetition 2 in FIG. 3), and the second SRS resource (SRS resource 1) for codebook based transmission indicated by the second SRS resource indicator (SRS resource indicator 1) is associated with the transmission of the third and fourth configured grant PUSCH repetitions (e.g., repetition 3 and repetition 4 in FIG. 3).

Since the first SRS resource is associated with the first power control parameter set (power control parameter set 0), the power of first and second repetitions is determined according to the power control parameter set 0 as shown in FIG. 3. Since the second SRS resource is associated with the second power control parameter set (power control parameter set 1), the power of third and fourth repetitions is determined by the power control parameter set 1 as shown in FIG. 3.

It should be understood that the above RRC signaling is just an example, and persons skilled in the art would appreciate that the RRC signaling can be changed according to actual situations or needs. In an example, more SRS resource indicators, p0-PUSCH-Alpha Ids, pathloss referenceRS Ids, and closed loop indexes can be configured. Alternatively, in another example, only one p0-PUSCH-Alpha and one closed loop index can be configured. Alternatively, in yet another example, a beam mapping pattern can be configured in another RRC signaling not with the above SRS resource indicators, p0-PUSCH-Alpha Ids, pathloss referenceRS Ids, and closed loop indexes together.

Figure 4:
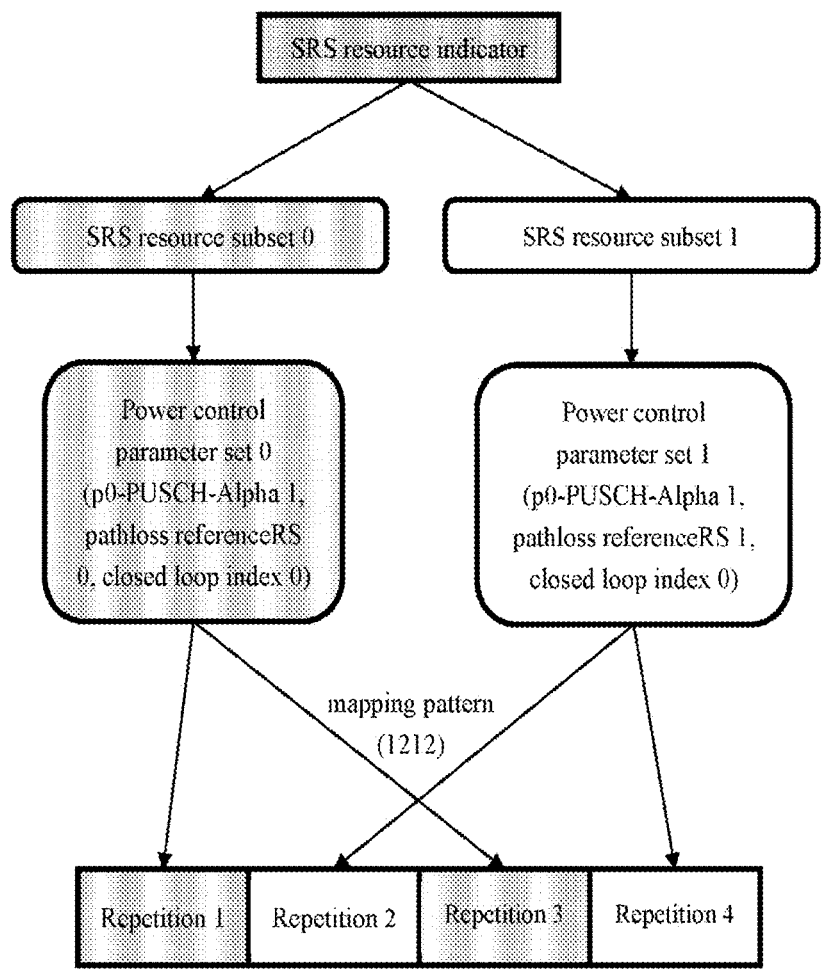
FIG. 4 illustrates another exemplary scenario of power control of a configured grant Type 1 PUSCH repetition according to another embodiment of the present disclosure.

FIG. 4 illustrates another exemplary scenario of power control of a configured grant Type 1 PUSCH repetition according to another exemplary embodiment of the present disclosure.

In this exemplary scenario, it is assumed that a configured grant Type 1 PUSCH transmission with non-codebook based transmission is configured to be transmitted repeatedly in 4 slots.

In this exemplary embodiment, a UE may receive RRC signaling from a BS, for example, the RRC signaling configures one SRS resource indicator, power control parameters including one p0-PUSCH-Alpha Id, two pathloss referenceRS Ids, and one closed loop index, and a mapping pattern, and is shown as follows:

```
ConfiguredGrantConfig ::=             SEQUENCE {
    frequency Hopping                     ENUMERATED {intraSlot, interSlot}
OPTIONAL, -- Need S
    cg-DMRS-Configuration                 DMRS-UplinkConfig,
    mcs-Table                             ENUMERATED {qam256, qam64LowSE}
OPTIONAL, -- Need S
    mcs-TableTransformPrecoder            ENUMERATED {qam256, qam64LowSE}
OPTIONAL, -- Need S
    uci-OnPUSCH                               SetupRelease { CG-UCI-OnPUSCH }
```

```
OPTIONAL, -- Need M
  resourceAllocation                ENUMERATED { resourceAllocationType0,
resourceAllocationType1, dynamicSwitch },
  rbg-Size                          ENUMERATED {config2}
OPTIONAL, -- Need S
  powerControlLoopToUse             ENUMERATED {n0, n1},
  p0-PUSCH-Alpha                    P0-PUSCH-AlphaSetId,
    beamMappingPattern              ENUMERATED {cyclicMapping,
sequenticalMapping}
  transformPrecoder                 ENUMERATED {enabled, disabled}
OPTIONAL, -- Need S
  nrofHARQ-Processes                INTEGER(1..16),
  repK                              ENUMERATED {n1, n2, n4, n8},
  repK-RV                           ENUMERATED {s1-0231, s2-0303, s3-0000}
OPTIONAL, -- Need R
  periodicity                       ENUMERATED {ym2, sym7, sym1x14, sym2x14,
sym4x14, sym5x14, sym8x14, sym10x14, sym16x14, sym20x14, sym32x14, sym40x14,
sym64x14, sym80x14, sym128x14, sym160x14, sym256x14, sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym16x12, sym20x12,
sym32x12, sym40x12, sym64x12, sym80x12, sym128x12, sym160x12, sym256x12, sym320x12,
sym512x12, sym640x12, sym1280x12, sym2560x12},
  configuredGrantTimer              INTEGER (1..64)
OPTIONAL, -- Need R
  rrc-ConfiguredUplinkGrant         SEQUENCE {
    timeDomainOffset                          INTEGER (0..5119),
    timeDomainAllocation                      INTEGER (0..15),
    frequencyDomainAllocation                 BIT STRING (SIZE(18)),
    antennaPort                               INTEGER (0..31),
    dmrs-SeqInitialization                    INTEGER (0..1)          OPTIONAL, --
Need R
    precodingAndNumberOfLayers                INTEGER (0..63),
    srs-ResourceIndicator                     INTEGER (0..15)          OPTIONAL,
-- Need R
    mcsAndTBS                                 INTEGER (0..31),
    frequencyHoppingOffset                    INTEGER
(1..maxNrofPhysicalResourceBlocks-1) OPTIONAL,       -- Need R
    pathlossReferenceIndex                    INTEGER (0..maxNrofPUSCH-
PathlossReferenceRSs-1),
    pathlossReferenceIndex1                   INTEGER (0..maxNrofPUSCH-
PathlossReferenceRSs-1),
    ...
  }
OPTIONAL, -- Need R
  ...
}
```

As shown in the above RRC signaling and FIG. 4, one enhanced SRS resource indicator, e.g., srs-ResourceIndicator (corresponding to SRS resource indicator in FIG. 4) is configured in rrc-ConfiguredUplinkGrant to indicate two SRS resource subsets e.g., first SRS resource subset (SRS resource subset 0 in FIG. 4) and second SRS resource subset (SRS resource subset 1 in FIG. 4).

Besides, two pathloss reference RS Ids, e.g., pathlossReferenceIndex and pathlossReferenceIndex1 (corresponding to pathloss reference RS 0 and pathloss reference RS 1 in FIG. 4) are configured in rrc-ConfiguredUplinkGrant. One p0-PUSCH-Alpha Id, e.g., p0-PUSCH-Alpha (corresponding to p0-PUSCH-Alpha 1 in FIG. 4) and one closed loop index, e.g., powerControlLoopToUse (corresponding to closed loop index 0 in FIG. 4) are configured in ConfiguredGrantConfig.

As described above, a first power control parameter set (power control parameter set 0 in FIG. 4) composed of pathloss reference RS 0, p0-PUSCH-Alpha 1 and closed loop index 0 is associated with the first SRS resource subset (SRS resource subset 0 in FIG. 4). And second power control parameter set (power control parameter set 1 in FIG. 4) composed of pathloss reference RS 1, p0-PUSCH-Alpha 1 and closed loop index 0 is associated with the second SRS resource subset (SRS resource subset 1 in FIG. 4).

Besides, a mapping pattern e.g., beamMappingPattern (corresponding to mapping pattern in FIG. 4) is configured in ConfiguredGrantConfig. In this exemplary scenario, as show in FIG. 4, it is assumed that the mapping pattern is 1212, which means the first SRS resource subset (SRS resource subset 0) for non-codebook based transmission indicated by the SRS resource indicator is associated with the transmission of the first and third configured grant PUSCH repetitions (e.g., repetition 1 and repetition 3 in FIG. 4), and the second SRS resource subset (SRS resource subset 1) for non-codebook based transmission indicated by the SRS resource indicator is associated the transmission of the second and fourth configured grant PUSCH repetitions (e.g., repetition 2 and repetition 4 in FIG. 4).

Since the first SRS resource subset is associated with the first power control parameter set (power control parameter set 0), the power of first and third repetitions is determined according to the power control parameter set 0 as shown in FIG. 4. Since the second SRS resource subset is associated with the second power control parameter set (power control parameter set 1), the power of second and fourth repetitions is determined by the power control parameter set 1 as shown in FIG. 4.

It should be understood that the above RRC signaling is just an example, and persons skilled in the art would appreciate that the RRC signaling can be changed according to actual situations or needs. In an example, more p0-PUSCH-Alpha Ids, pathloss referenceRS Ids, and closed loop indexes can be configured. Alternatively, in another example, a beam mapping pattern can be configured in another RRC signaling not with the above SRS resource indicator, p0-PUSCH-Alpha Id, pathloss referenceRS Ids, and closed loop index together.

Power Control of Configured Grant Type 2 PUSCH Repetition

For configured grant Type 2 PUSCH, there is no rrc-ConfiguredUplinkGrant in configuredGrantConfig in the RRC signaling, and a UE may receive a DCI to activate a configured grant Type 2 PUSCH transmission, from a BS. If there is a SRI field in the DCI, a SRS resource in a SRS resource set with usage set as 'codebook' is indicated by the SRI field for codebook based PUSCH transmission or a subset of SRS resources in a SRS resource set with usage set as 'non-codebook' are indicated by the SRI field for non-codebook based PUSCH transmission in R15.

In the present application, in order to support configured grant Type 2 PUSCH repetitions with multiple beams, the SRI field can be enhanced to indicate multiple SRS resources for codebook based transmission or multiple SRS resource subsets for non-codebook based transmission. Two schemes may be adopted for the SRI field in the DCI to indicate multiple beams associated with multiple SRS resources for codebook based transmission or multiple SRS resource subsets for non-codebook based transmission. Accordingly, two schemes may be adopted to determine multiple pathloss reference RS Ids of power control parameters of configured grant Type 2 PUSCH repetitions by mapping the SRI field of the activated DCI to configured SRI-PUSCH-PowerControl list(s) for configured grant Type 2 PUSCH transmission.

For example, a first scheme is that the SRI field includes multiple SRI values where each SRI value indicates one SRS resource for codebook based transmission or one SRS resource subset for non-codebook based transmission.

For the first scheme, multiple SRI-PUSCH-PowerControl lists are configured, by a higher layer signaling, for example RRC signaling. The number of the SRI-PUSCH-PowerControl lists is the same as the number of the SRI values in the SRI field, and each SRI-PUSCH-PowerControl list is mapped to (or associated with) each SRI value. Furthermore, each SRI-PUSCH-PowerControl Id (or entry) included in one configured SRI-PUSCH-PowerControl list includes at least a pathloss reference RS Id. Therefore, each SRI value included in the SRI field is associated with a pathloss reference RS Id which is indicated by mapping the SRI value in the SRI field to its associated SRI-PUSCH-PowerControl list.

A second scheme is that the SRS filed includes only one enhanced SRI value which indicates multiple SRS resources for codebook based transmission or multiple SRS resource subsets for non-codebook based transmission. The mapping of the SRI value in the SRI field to the SRS resources for codebook based transmission or SRS resource subsets for non-codebook based transmission may be updated by a medium access control-control element (MAC-CE).

For the second scheme, one enhanced SRI-PUSCH-PowerControl list is configured by a higher layer signaling, for example RRC signaling. Multiple pathloss reference RS Ids are configured in at least one SRI-PUSCH-PowerControl Id within the enhanced SRI-PUSCH-PowerControl list. Furthermore, the multiple pathloss reference RS Ids are indicated by mapping the enhanced SRI value to the enhanced SRI-PUSCH-PowerControl list. The number of the pathloss reference RS Ids is the same as the number of the indicated SRS resources for codebook based transmission or the indicated SRS resource subsets for non-codebook based transmission by the enhanced SRI field. Each indicated SRS resource for codebook based transmission or each indicated SRS resource subset for non-codebook based transmission is associated with one pathloss reference RS Id included in the SRS-PUSCH-PowerControl Id.

Besides, for both of the first scheme and the second scheme, p0-PUSCH-Alpha Id(s) can be configured in configuredGrantConfig. In an embodiment, multiple p0-PUSCH-Alpha Ids can be configured in configuredGrantConfig with one to one mapping (or associated) with an indicated SRS resources for codebook based transmission or an indicated SRS resource subsets for non-codebook based transmission. In another embodiment, only one p0-PUSCH-Alpha Id can be configured in configuredGrantConfig, and the p0-PUSCH-Alpha Id is applied to (or associated with) all the indicated SRS resources for codebook based transmission or all the indicated SRS resource subsets for non-codebook based transmission.

Similarly, for both of the first scheme and the second scheme, closed loop index(es) can be configured in configuredGrantConfig. In an embodiment, multiple closed loop indexes can be configured in configuredGrantConfig with one to one mapping (or associated) with an indicated SRS resource for codebook based transmission or an indicated SRS resource subset for non-codebook based transmission. In another embodiment, only one closed loop index is configured in configuredGrantConfig, and the closed loop index is applied to (or associated with) all the indicated SRS resources for codebook based transmission or SRS resource subsets for non-codebook based transmission.

Similar to configured grant Type 1 PUSCH repetition, for configured grant Type 2 PUSCH repetition according to the embodiment of present application, a mapping pattern (or called a beam mapping pattern) is configured by higher layer signaling (for example, RRC signaling) to indicate each repetition of a configured grant PUSCH transmission is associated with which SRS resource for codebook based transmission or SRS resource subset for non-codebook based transmission indicated by the SRI field in the activated DCI.

Therefore, according to the above analysis, each SRS resource for codebook based transmission or SRS resource subset for non-codebook based transmission is associated with a corresponding power control parameter set including a pathloss reference RS Id, a p0-PUSCH-Alpha Id (power offset (p0-PUSCH) and compensation factor (alpha)) and a closed loop index. Therefore, a UE can determine a power of each repetition of a configured grant PUSCH transmission based on the corresponding power control parameter set.

Scenarios of power control of configured grant Type 2 PUSCH repetition are provided as below for illustrative purpose according to some embodiments of the present application in connection with FIGS. 5 and 6, by taking 2 beams of the UE for transmitting a configured grant PUSCH transmission with multiple repetitions.

Figure 5:
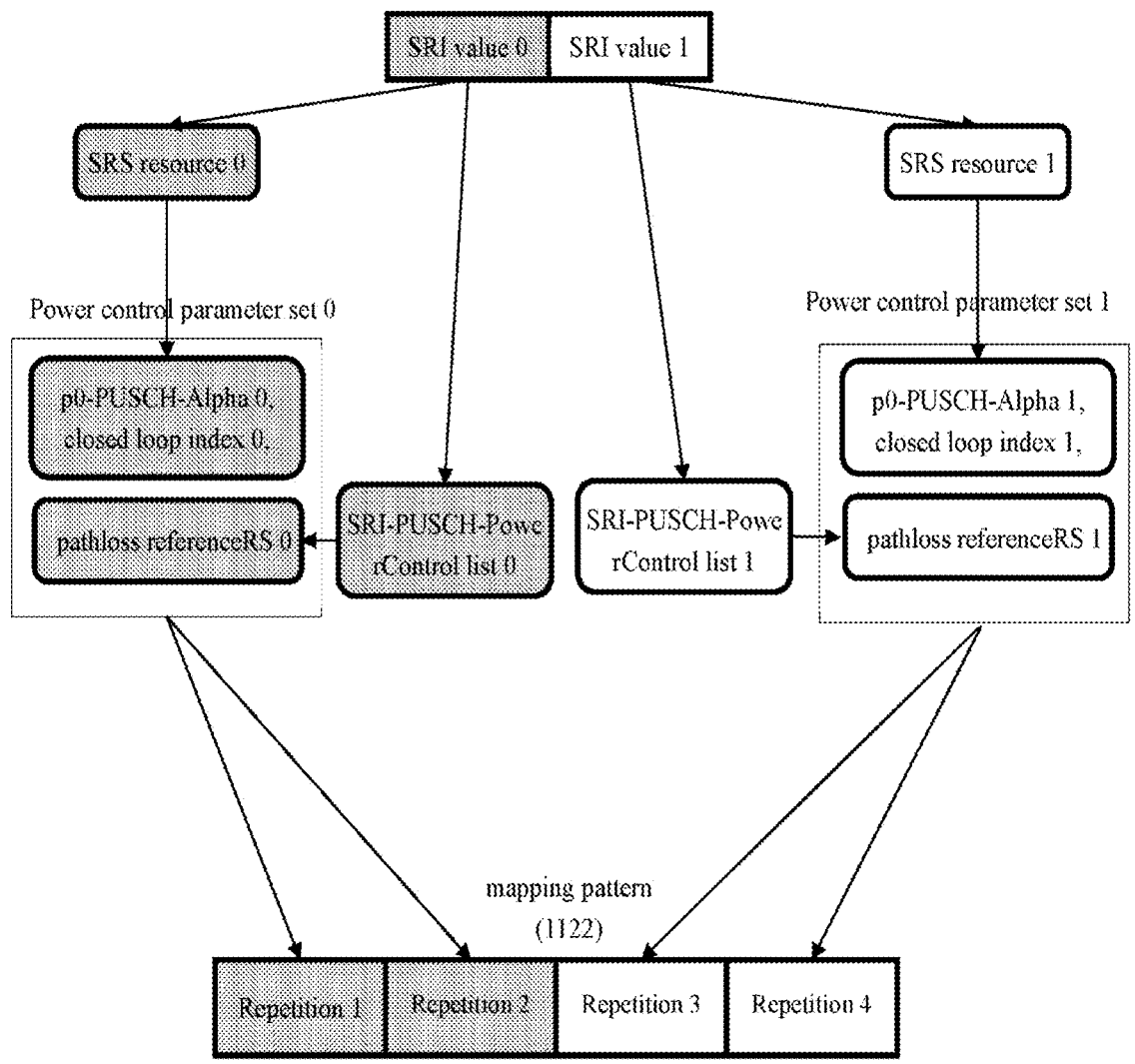
FIG. 5 illustrates an exemplary scenario of power control of a configured grant Type 2 PUSCH repetition according to another embodiment of the present disclosure.

FIG. 5 illustrates an exemplary scenario of power control of a configured grant Type 2 PUSCH repetition according to an exemplary embodiment of the present disclosure.

In this exemplary scenario, it is assumed that a configured grant Type 2 PUSCH transmission with codebook based transmission is configured to be transmitted repeatedly in 4 slots.

In this exemplary embodiment, a UE may receive a DCI including a SRI field from a BS. Two SRI values (SRI value 0 and SRI value 1 in FIG. 5) are included in the SRI field of the activated DCI to indicate two SRS resources (SRS resource 0 and SRS resource 1 in FIG. 5).

Besides, from a BS, the UE may receive RRC signaling of PUSCH-PowerControl in TS 38.331 in which two SRI-PUSCH-PowerControl lists (for example, SRI-PUSCH-PowerControl list 0 and SRI-PUSCH-PowerControl list 1 in FIG. 5) are configured. In the RRC signaling of PUSCH-PowerControl, each SRI-PUSCH-PowerControl list includes a pathloss reference RS Id. For example, in FIG. 5, a SRI-PUSCH-PowerControl Id within SRI-PUSCH-PowerControl list 0 includes pathloss reference RS 0, and a SRI-PUSCH-PowerControl Id within SRI-PUSCH-PowerControl list 1 includes pathloss reference RS 1. By the mapping the first SRI value (SRI value 0) of the SRI field to SRI-PUSCH-PowerControl list 0, pathloss reference RS 0 is indicated, and by the mapping the second SRI value (SRI value 1) of the SRI field to SRI-PUSCH-PowerControl list 1, pathloss reference RS 1 is indicated.

Furthermore, the UE may receive RRC signaling from a BS, for example, the RRC signaling configures power control parameters including two p0-PUSCH-Alpha Ids and two closed loop indexes, and a mapping pattern, and is shown as follows:

As described above, a first power control parameter set (power control parameter set 0) composed of pathloss reference RS 0, p0-PUSCH-Alpha 0 and closed loop index 0 is associated with the first SRS resource (SRS resource 0) indicated by SRI value 0. And a second power control parameter set (power control parameter set 1) composed of pathloss reference RS 1, p0-PUSCH-Alpha 1 and closed loop index 1 is associated with the second SRS resource (SRS resource 1) indicated by SRI value 1.

Besides, a mapping pattern e.g., beamMappingPattern (corresponding to mapping pattern in FIG. 5) is configured in ConfiguredGrantConfig. In this exemplary scenario, as show in FIG. 5, it is assumed that the mapping pattern is 1122, which means the first SRS resource (SRS resource 0) for codebook based transmission indicated by the first SRI value (SRI value 0) is associated with the transmission of the first and second configured grant PUSCH repetitions (e.g., repetition 1 and repetition 2 in FIG. 5), and the second SRS resource (SRS resource 1) for codebook based transmission indicated by the second SRI value (SRI value 1) is associated with the transmission of the third and fourth configured grant PUSCH repetitions (e.g., repetition 3 and repetition 4 in FIG. 5).

Since the first SRS resource is associated with the first power control parameter set (power control parameter set 0),

```
ConfiguredGrantConfig ::=        SEQUENCE {
    frequency Hopping                    ENUMERATED {intraSlot, interSlot}
OPTIONAL, -- Need S
    cg-DMRS-Configuration                DMRS-UplinkConfig,
    mcs-Table                            ENUMERATED {qam256, qam64LowSE}
OPTIONAL, -- Need S
    mcs-TableTransformPrecoder           ENUMERATED {qam256, qam64LowSE}
OPTIONAL, -- Need S
    uci-OnPUSCH                          SetupRelease { CG-UCI-OnPUSCH }
OPTIONAL, -- Need M
    resource Allocation                  ENUMERATED { resourceAllocationType0,
resourceAllocationType1, dynamicSwitch },
    rbg-Size                             ENUMERATED {config2}
OPTIONAL, -- Need S
    powerControlLoopToUse                ENUMERATED {n0, n1},
    powerControlLoopToUse1               ENUMERATED {n0, n1},
    p0-PUSCH-Alpha                       P0-PUSCH-AlphaSetId,
    p0-PUSCH-Alpha1                      P0-PUSCH-AlphaSetId,
    beamMappingPattern                   ENUMERATED {cyclicMapping,
sequenticalMapping}
    transformPrecoder                    ENUMERATED {enabled, disabled}
OPTIONAL, -- Need S
    nrofHARQ-Processes                   INTEGER(1..16),
    repK                                 ENUMERATED {n1, n2, n4, n8},
    repK-RV                              ENUMERATED {s1-0231, s2-0303, s3-0000}
OPTIONAL, -- Need R
    periodicity                          ENUMERATED {ym2, sym7, sym1x14, sym2x14,
sym4x14, sym5x14, sym8x14, sym10x14, sym16x14, sym20x14, sym32x14, sym40x14,
sym64x14, sym80x14, sym128x14, sym160x14, sym256x14, sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym16x12, sym20x12,
sym32x12, sym40x12, sym64x12, sym80x12, sym128x12, sym160x12, sym256x12, sym320x12,
sym512x12, sym640x12, sym1280x12, sym2560x12},
    configuredGrantTimer                 INTEGER (1..64)
OPTIONAL, -- Need R
    ...
}
```

As shown in the above RRC signaling and FIG. 5, two p0-PUSCH-Alpha Ids, e.g., p0-PUSCH-Alpha andp0-PUSCH-Alpha1 (corresponding to p0-PUSCH-Alpha 0 and p0-PUSCH-Alpha 1 in FIG. 5) and two closed loop indexes, e.g., powerControlLoopToUse and powerControlLoopToUse1 (corresponding to closed loop index 0 and closed loop index 1 in FIG. 5) are configured in ConfiguredGrantConfig.

the power of first and second repetitions is determined according to the power control parameter set 0 as shown in FIG. 5. Since the second SRS resource is associated with the second power control parameter set (power control parameter set 1), the power of third and fourth repetitions is determined by the power control parameter set 1 as shown in FIG. 5.

It should be understood that the above RRC signaling is just an example, and persons skilled in the art would appreciate that the RRC signaling can be changed according to actual situations or needs. In an example, more p0-PUSCH-Alpha Ids and closed loop indexes can be configured. Alternatively, in another example, only one p0-PUSCH-Alpha and one closed loop index can be configured. Alternatively, in yet another example, a beam mapping pattern can be configured in another RRC signaling not with the p0-PUSCH-Alpha Ids and closed loop indexes together.

Figure 6:
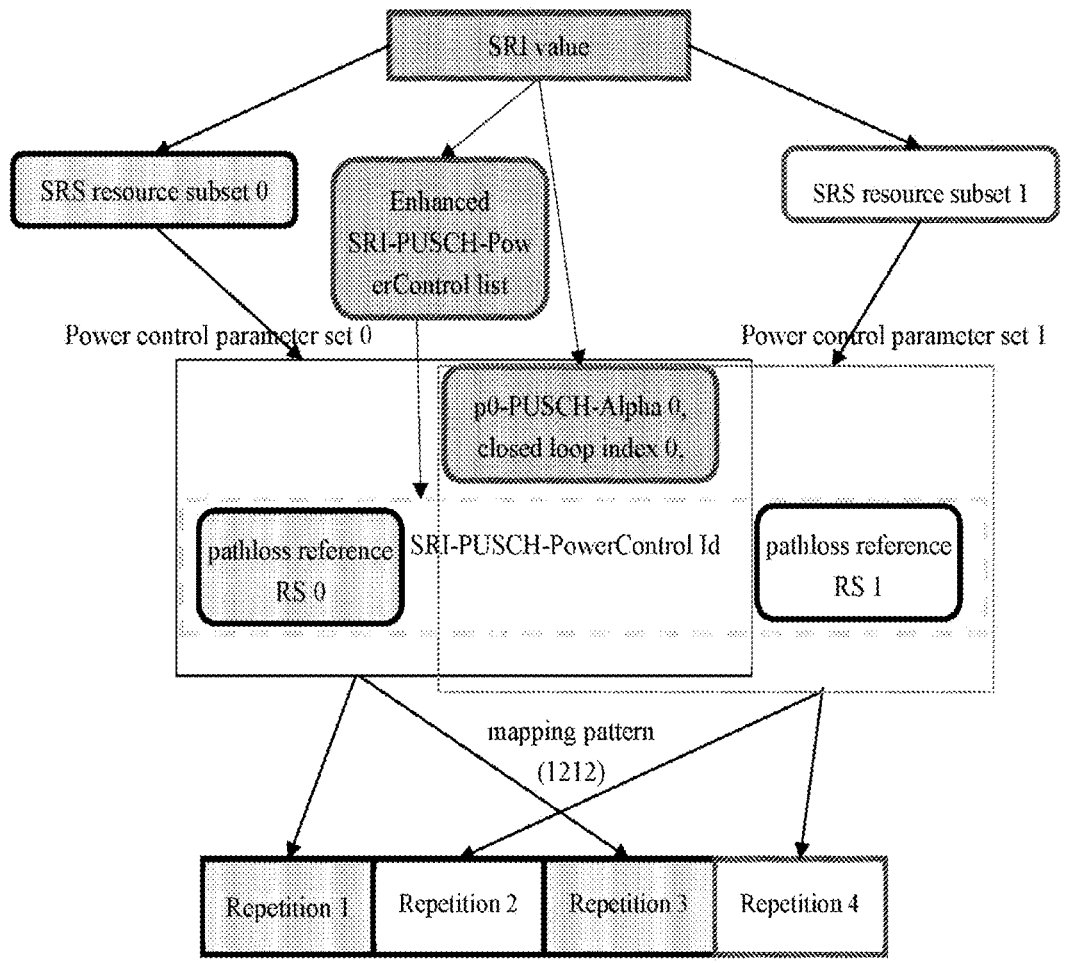
FIG. 6 illustrates another exemplary scenario of power control of a configured grant Type 2 PUSCH repetition according to another embodiment of the present disclosure.

FIG. 6 illustrates another exemplary scenario of power control of a configured grant Type 2 PUSCH repetition according to another exemplary embodiment of the present disclosure.

trol Id is configured to include two pathloss reference RS Ids (pathloss reference RS 0 and pathloss reference RS 1 in FIG. 6). By mapping the SRI value of the SRI field to the enhanced SRI-PUSCH-PowerControl list, pathloss reference RS 0 and pathloss reference RS 1 are indicated, and pathloss reference RS 0 is associated with SRS resource subset 0 and pathloss reference RS 1 is associated with SRS resource subset 1.

Furthermore, the UE may receive RRC signaling from a BS, for example, in this exemplary scenario, the RRC signaling configures power control parameters including one p0-PUSCH-Alpha Id and one closed loop index, and a mapping pattern, and is shown as follows:

```
ConfiguredGrantConfig ::=              SEQUENCE {
     frequency Hopping                          ENUMERATED {intraSlot, interSlot}
OPTIONAL, -- Need S
     cg-DMRS-Configuration                      DMRS-UplinkConfig,
     mcs-Table                                  ENUMERATED {qam256, qam64LowSE}
OPTIONAL, -- Need S
     mcs-TableTransformPrecoder                 ENUMERATED {qam256, qam64LowSE}
OPTIONAL, -- Need S
     uci-OnPUSCH                                        SetupRelease { CG-UCI-OnPUSCH }
OPTIONAL, -- Need M
     resource Allocation                        ENUMERATED { resourceAllocationType0,
resourceAllocationType1, dynamicSwitch },
     rbg-Size                                   ENUMERATED {config2}
OPTIONAL, -- Need S
     powerControlLoopToUse                          ENUMERATED {n0, n1},
     p0-PUSCH-Alpha                                 P0-PUSCH-AlphaSetId,
         beamMappingPattern                     ENUMERATED {cyclicMapping,
sequenticalMapping}
     transformPrecoder                ENUMERATED {enabled, disabled}
OPTIONAL, -- Need S
     nrofHARQ-Processes               INTEGER(1..16),
     repK                                     ENUMERATED {n1, n2, n4, n8},
     repK-RV                                  ENUMERATED {s1-0231, s2-0303, s3-0000}
OPTIONAL, -- Need R
     periodicity                              ENUMERATED {ym2, sym7, sym1x14, sym2x14,
sym4x14, sym5x14, sym8x14, sym10x14, sym16x14, sym20x14, sym32x14, sym40x14,
sym64x14, sym80x14, sym128x14, sym160x14, sym256x14, sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym16x12, sym20x12,
sym32x12, sym40x12, sym64x12, sym80x12, sym128x12, sym160x12, sym256x12, sym320x12,
sym512x12, sym640x12, sym1280x12, sym2560x12},
     configuredGrantTimer                         INTEGER (1..64)
OPTIONAL, -- Need R
     ...
}
```

In this exemplary scenario, it is assumed that a configured grant Type 2 PUSCH transmission with non-codebook based transmission is configured to be transmitted repeatedly in 4 slots.

In this exemplary embodiment, a UE may receive a DCI including a SRI field from a BS. One SRI value (SRI value in FIG. 6) is included in the SRI field of the activated DCI to indicate two SRS resource subsets (SRS resource subset 0 and SRS resource subset 1 in FIG. 6).

Besides, the UE may receive from a BS, RRC signaling of PUSCH-PowerControl in TS 38.331 in which one enhanced SRI-PUSCH-PowerControl list (for example, Enhanced SRI-PUSCH-PowerControl list in FIG. 6) is configured. In the RRC signaling of PUSCH-PowerControl, the enhanced SRI-PUSCH-PowerControl list may include at least one entry which is configured to include two pathloss reference RS Ids. For example, in FIG. 6, the enhanced SRI-PUSCH-PowerControl list includes an SRI-PUSCH-PowerControl Id (entry), and the SRI-PUSCH-PowerCon- As shown in the above RRC signaling and FIG. 6, one p0-PUSCH-Alpha Id, e.g., p0-PUSCH-Alpha Id (corresponding to p0-PUSCH-Alpha 0 in FIG. 6) and one closed loop index, e.g., powerControlLoopToUse (corresponding to closed loop index 0 in in FIG. 6) are configured in ConfiguredGrantConfig.

As described above, a first power control parameter set (power control parameter set 0) composed of pathloss reference RS 0, p0-PUSCH-Alpha 0 and closed loop index 0 is associated with the first SRS resource subset (SRS resource subset 0) indicated by the SRI value in the SRI field. And a second power control parameter set (power control parameter set 1) composed of pathloss reference RS 1, p0-PUSCH-Alpha 0 and closed loop index 0 is associated with the second SRS resource subset (SRS resource subset 1) indicated by the SRI value in the SRI field.

Besides, a mapping pattern, e.g., beamMappingPattern (corresponding to mapping pattern in FIG. 6) is configured in ConfiguredGrantConfig. In this exemplary scenario, as show in FIG. 6, it is assumed that the mapping pattern is 1212, which means the first SRS resource subset (SRS resource subset 0) for non-codebook based transmission indicated by the SRI value is associated with the transmission of the first and third configured grant PUSCH repetitions (e.g., repetition 1 and repetition 3 in FIG. 6), and the second SRS resource subset (SRS resource subset 1) for non-codebook based transmission indicated by the SRI value is associated the transmission of the second and fourth configured grant PUSCH repetitions (e.g., repetition 2 and repetition 4 in FIG. 6).

Since the first SRS resource subset is associated with the first power control parameter set (power control parameter set 0), the power of first and third repetitions is determined according to the power control parameter set 0 as shown in FIG. 6. Since the second SRS resource subset is associated with the second power control parameter set (power control parameter set 1), the power of second and fourth repetitions is determined by the power control parameter set 1 as shown in FIG. 6.

It should be understood that the above RRC signaling is just an example, and persons skilled in the art would appreciate that the RRC signaling can be changed according to actual situations or needs. In an example, more p0-PUSCH-Alpha Ids and closed loop indexes can be configured. Alternatively, in another example, a beam mapping pattern can be configured in another RRC signaling not with the p0-PUSCH-Alpha Ids and closed loop indexes together.

Therefore, through the above described embodiments of the present application, the UE may determine the power of each PUSCH repetition of the configured grant PUSCH transmission when the configured grant PUSCH repetitions are transmitted by multiple beams at UE side.

Figure 7:
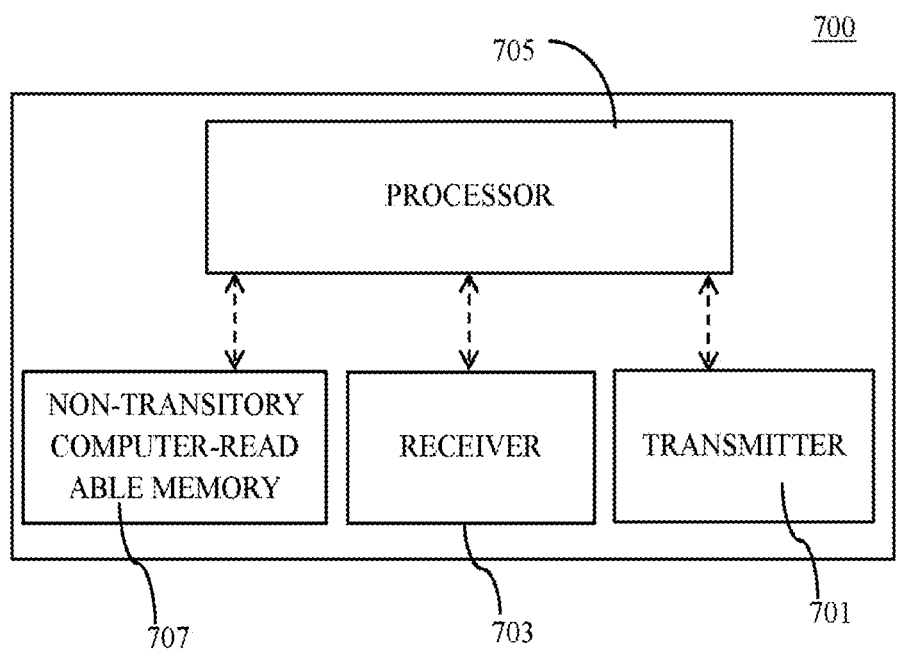
FIG. 7 is a schematic block diagram illustrating an exemplary apparatus according to an embodiment of the present disclosure.

FIG. 7 illustrates an apparatus according to some embodiments of the present application. In some embodiments of the present disclosure, the apparatus 700 may be UE 107 illustrated in FIG. 1 or the UE in other embodiments of the present application.

As shown in FIG. 7, the apparatus 700 may include a receiver 701, a transmitter 703, a processor 705, and a non-transitory computer-readable medium 707. The non-transitory computer-readable medium 707 has computer executable instructions stored therein. The processor 705 is configured to be coupled to the non-transitory computer readable medium 707, the receiver 701, and the transmitter 703. It is contemplated that the apparatus 700 may include more computer-readable mediums, receiver, transmitter and processors in some other embodiments of the present application according to practical requirements. In some embodiments of the present application, the receiver 701 and the transmitter 703 are integrated into a single device, such as a transceiver. In certain embodiments, the apparatus 700 may further include an input device, a memory, and/or other components.

In some embodiments of the present application, the non-transitory computer-readable medium 707 may have stored thereon computer-executable instructions to cause a processor to implement the above methods according to embodiments of the present application.

Figure 8:
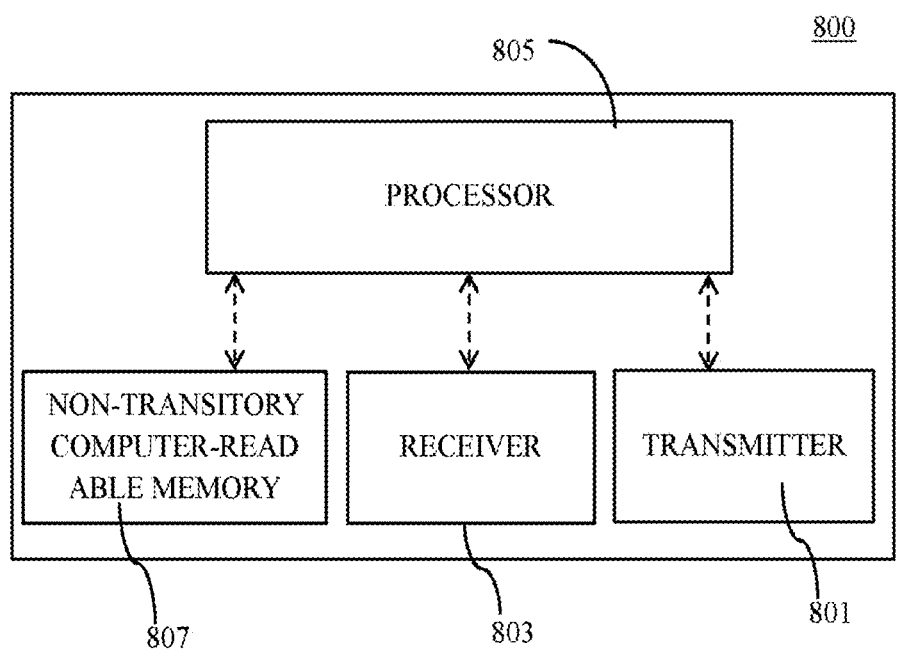
FIG. 8 is a schematic block diagram illustrating another exemplary apparatus according to an embodiment of the present disclosure.

FIG. 8 illustrates an apparatus according to some other embodiments of the present application. In some embodiments of the present disclosure, the apparatus 800 may be BS 101 illustrated in FIG. 1 or the BS in other embodiments of the present application.

As shown in FIG. 8, the apparatus 800 may include a receiver 801, a transmitter 803, a processor 805, and a non-transitory computer-readable medium 807. The non-transitory computer-readable medium 807 has computer executable instructions stored therein. The processor 805 is configured to be coupled to the non-transitory computer readable medium 807, the receiver 801, and the transmitter 803. It is contemplated that the apparatus 800 may include more computer-readable mediums, receiver, transmitter and processors in some other embodiments of the present application according to practical requirements. In some embodiments of the present application, the receiver 801 and the transmitter 803 are integrated into a single device, such as a transceiver. In certain embodiments, the apparatus 800 may further include an input device, a memory, and/or other components.

In some embodiments of the present application, the non-transitory computer-readable medium 807 may have stored thereon computer-executable instructions to cause a processor to implement the above methods according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method, comprising:
   receiving a configuration including a mapping pattern and a plurality of pathloss reference signal (RS) identifiers (Ids) for a configured grant physical uplink shared channel (PUSCH) transmission, which is configured to be transmitted in a plurality of time intervals repeatedly by higher layer signaling;

determining a power of each PUSCH repetition of the configured grant PUSCH transmission based on the configuration; and transmitting the configured grant PUSCH transmission in the plurality of time intervals repeatedly based on the determined power of each PUSCH repetition of the configured grant PUSCH transmission and the mapping pattern.

2. The method of claim 1, wherein the plurality of pathloss reference RS Ids are configured in rrc-ConfiguredUplinkGrant included in configuredGrantConfig.

3. The method of claim 1, wherein the configuration further includes one or more sounding reference signal (SRS) resource indicators, and each SRS resource indicator indicates one SRS resource for codebook based transmission or one SRS resource subset for non-codebook based transmission.

4. The method of claim 3, wherein the configuration further includes one or more p0-PUSCH-Alpha Ids, and each p0-PUSCH-Alpha Id is associated with one SRS resource indicated by one SRS resource indicator of the one or more SRS resource indicators for the codebook based transmission or one SRS resource subset indicated by the one SRS resource indicator of the one or more SRS resource indicators for the non-codebook based transmission.

5. The method of claim 3, wherein the configuration further includes one or more closed loop indexes, and each closed loop index is associated with one SRS resource indicated by one SRS resource indicator of the one or more SRS resource indicators for the codebook based transmission or one SRS resource subset indicated by the one SRS resource indicator of the one or more SRS resource indicators for the non-codebook based transmission.

6. The method of claim 3, wherein each pathloss reference RS Id of the plurality of pathloss reference RS Ids is associated with one SRS resource indicated by one SRS resource indicator of the one or more SRS resource indicators for the codebook based transmission or one SRS resource subset indicated by the one SRS resource indicator of the one or more SRS resource indicators for the non-codebook based transmission.

7. The method of claim 3, wherein the mapping pattern indicates each PUSCH repetition which the one SRS resource for the codebook based transmission or the one SRS resource subset for the non-codebook based transmission is associated with.

8. The method of claim 1, wherein RRC-ConfiguredUplinkGrant is not included in configuredGrantConfig, and the method further comprises:

receiving a sounding reference signal resource indicator (SRI) field of an activated downlink control information (DCI) of the configured grant PUSCH transmission, wherein the SRI field includes at least one SRI value indicating one or more sounding reference signal (SRS) resources for codebook based transmission or one or more SRS resource subsets for non-codebook based transmission.

9. The method of claim 8, wherein the SRI field includes a plurality of SRI values are in the SRI field, and each SRI value indicates one SRS resource for the codebook based transmission or one SRS resource subset for the non-codebook based transmission.

10. An apparatus, comprising:
a receiver;
a transmitter; and
a processor coupled to the receiver and the transmitter configured to cause the apparatus to:
receive a configuration including a mapping pattern and a plurality of pathloss reference signal (RS) identifiers (Ids) for a configured grant physical uplink shared channel (PUSCH) transmission configured to be transmitted in a plurality of time intervals repeatedly;
determine a power of each PUSCH repetition of the configured grant PUSCH transmission based on the configuration; and
transmit the configured grant PUSCH transmission in the plurality of time intervals repeatedly based on the power of each PUSCH repetition of the configured grant PUSCH transmission and the mapping pattern.

11. The apparatus of claim 10, wherein the configuration includes one or more sounding reference signal (SRS) resource indicators, and each SRS resource indicator indicates one or more SRS resources for codebook based transmission or one or more SRS resource subsets for non-codebook based transmission.

12. The apparatus of claim 11, wherein the configuration includes one or more p0-PUSCH-Alpha Ids, and each p0-PUSCH-Alpha Id is associated with one SRS resource indicated by one SRS resource indicator of the one or more SRS resource indicators for the codebook based transmission or one SRS resource subset indicated by the one SRS resource indicator of the one or more SRS resource indicators for the non-codebook based transmission.

13. The apparatus of claim 11, wherein the configuration includes one or more closed loop indexes, and each closed loop index is associated with one SRS resource indicated by one SRS resource indicator of the one or more SRS resource indicators for the codebook based transmission or a SRS resource subset indicated by the one SRS resource indicator of the one or more SRS resource indicators for the non-codebook based transmission.

14. The apparatus of claim 11, wherein each pathloss reference RS Id of the plurality of pathloss reference RS Ids is associated with one SRS resource indicated by one SRS resource indicator of the one or more SRS resource indicators for the codebook based transmission or one SRS resource subset indicated by the one SRS resource indicator of the one or more SRS resource indicators for the non-codebook based transmission.

15. An apparatus, comprising:
a receiver;
a transmitter; and
a processor coupled to the receiver and the transmitter configured to cause the apparatus to:
transmit a configuration including a mapping pattern and a plurality of pathloss reference signal (RS) identifiers (Ids) for a configured rant physical uplink shared channel (PUSCH) transmission, which is configured to be transmitted in a plurality of time intervals repeatedly; and
receive the configured grant PUSCH transmission in the plurality of time intervals repeatedly according to the mapping pattern, wherein a power of each PUSCH repetition of the configured grant PUSCH transmission is determined based on the configuration.

16. The apparatus of claim 15, wherein the plurality of pathloss reference RS Ids are configured in rrc-ConfiguredUplinkGrant included in configuredGrantConfig.

17. The apparatus of claim 15, wherein the configuration includes one or more sounding reference signal (SRS) resource indicators, and each SRS resource indicator indicates one or more SRS resources for codebook based transmission or one or more SRS resource subsets for non-codebook based transmission.

18. The apparatus of claim 17, wherein the configuration includes one or more p0-PUSCH-Alpha Ids, and each p0-PUSCH-Alpha Id is associated with one SRS resource indicated by one SRS resource indicator of the one or more SRS resource indicators for the codebook based transmission or one SRS resource subset indicated by the one SRS resource indicator of the one or more SRS resource indicators for the non-codebook based transmission.

19. The apparatus of claim 17, wherein the configuration includes one or more closed loop indexes, and each closed loop index is associated with one SRS resource indicated by one SRS resource indicator of the one or more SRS resource indicators for the codebook based transmission or one SRS resource subset indicated by the one SRS resource indicator of the one or more SRS resource indicators for the non-codebook based transmission.

20. The apparatus of claim 17, wherein each pathloss reference RS Id of the plurality of pathloss reference RS Ids is associated with one SRS resource indicated by one SRS resource indicator of the one or more SRS resource indicators for the codebook based transmission or one SRS resource subset indicated by the one SRS resource indicator of the one or more SRS resource indicators for the non-codebook based transmission.

* * * * *